(12) United States Patent
Nosohara

(10) Patent No.: US 6,571,241 B1
(45) Date of Patent: May 27, 2003

(54) MULTILINGUAL PATENT INFORMATION SEARCH SYSTEM

(75) Inventor: Makifumi Nosohara, Hiroshimi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/260,721

(22) Filed: Mar. 2, 1999

(30) Foreign Application Priority Data

Mar. 3, 1998 (JP) .......................................... 10-050659

(51) Int. Cl.$^7$ .............................................. G06F 17/30
(52) U.S. Cl. ................................ 707/6; 707/1; 707/10; 707/536; 707/512; 704/3; 704/4; 704/8
(58) Field of Search ................................ 707/1–10, 536, 707/512; 704/3, 9

(56) References Cited

U.S. PATENT DOCUMENTS

| | | | | |
|---|---|---|---|---|
| 4,630,235 A | * | 12/1986 | Hashimoto et al. ............ 704/4 |
| 5,148,541 A | * | 9/1992 | Lee et al. ....................... 707/2 |
| 5,278,980 A | * | 1/1994 | Pedersen et al. ................ 707/4 |
| 5,845,301 A | * | 12/1998 | Rivette et al. ............... 707/512 |
| 6,064,951 A | * | 5/2000 | Park et al. ..................... 704/8 |
| 6,092,035 A | * | 7/2000 | Kurachi et al. ................ 704/3 |
| 6,094,647 A | * | 7/2000 | Kato et al. ..................... 707/2 |

* cited by examiner

Primary Examiner—Hosain T. Alam
Assistant Examiner—Anh Ly

(57) ABSTRACT

There is provided an information search system that can be easily used by a foreigner. A client terminal is connected to an information search apparatus through a network. The information search apparatus is a server for searching for, e.g., patent information filed in Japan, and searches various databases storing Japanese patent information and the like in response to a request from the client terminal. The database server is connected to the information search apparatus and includes various databases.

78 Claims, 21 Drawing Sheets

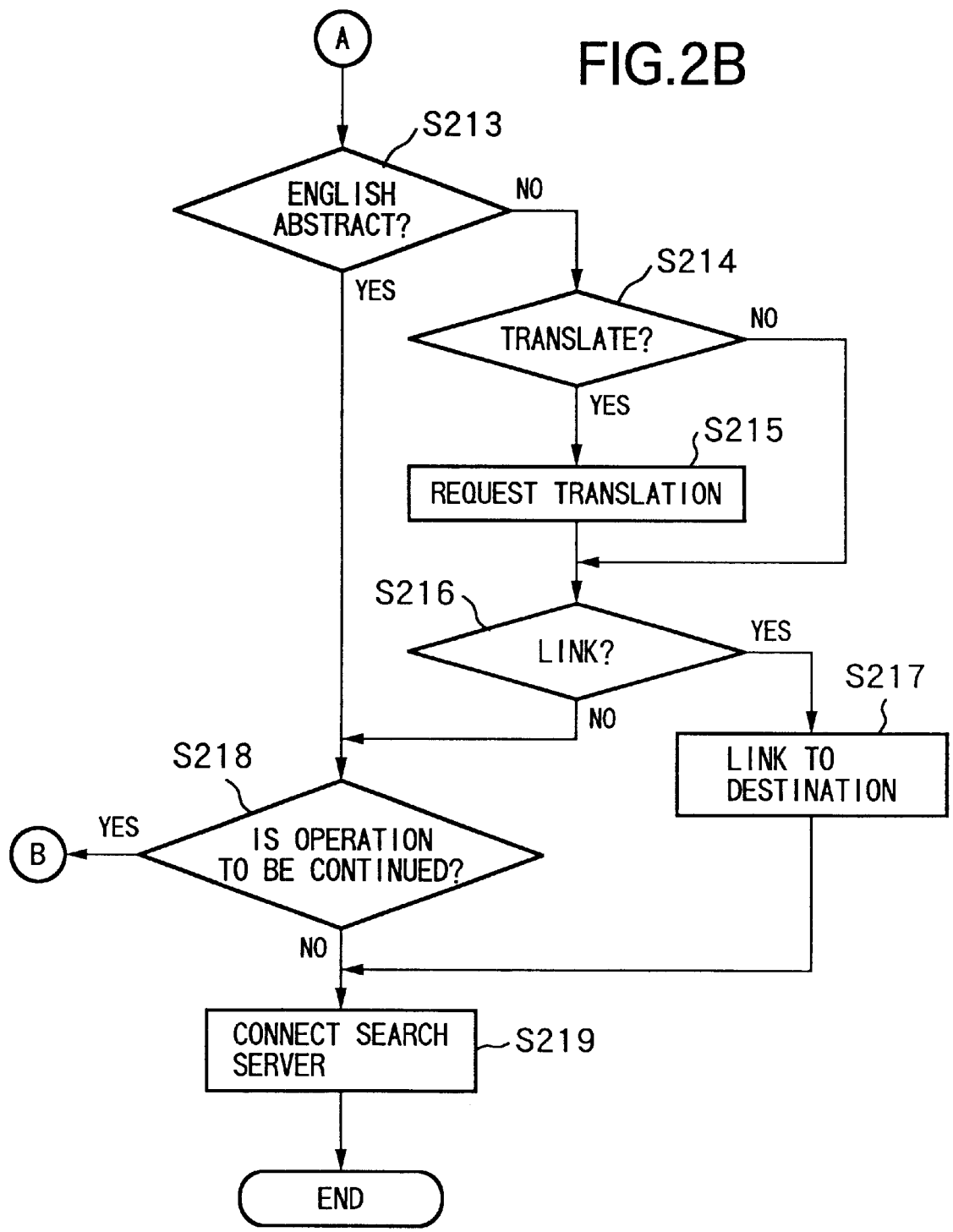

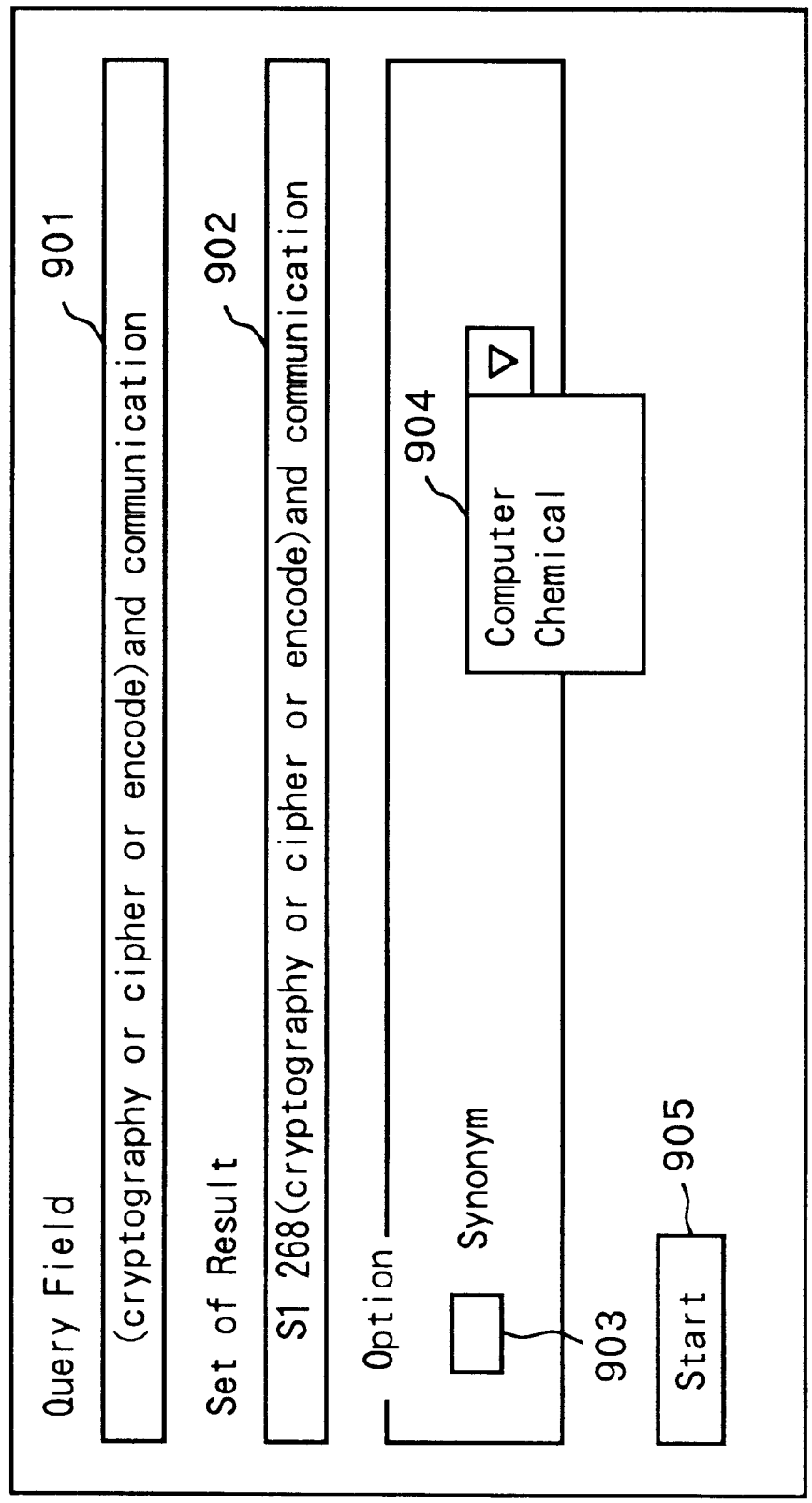

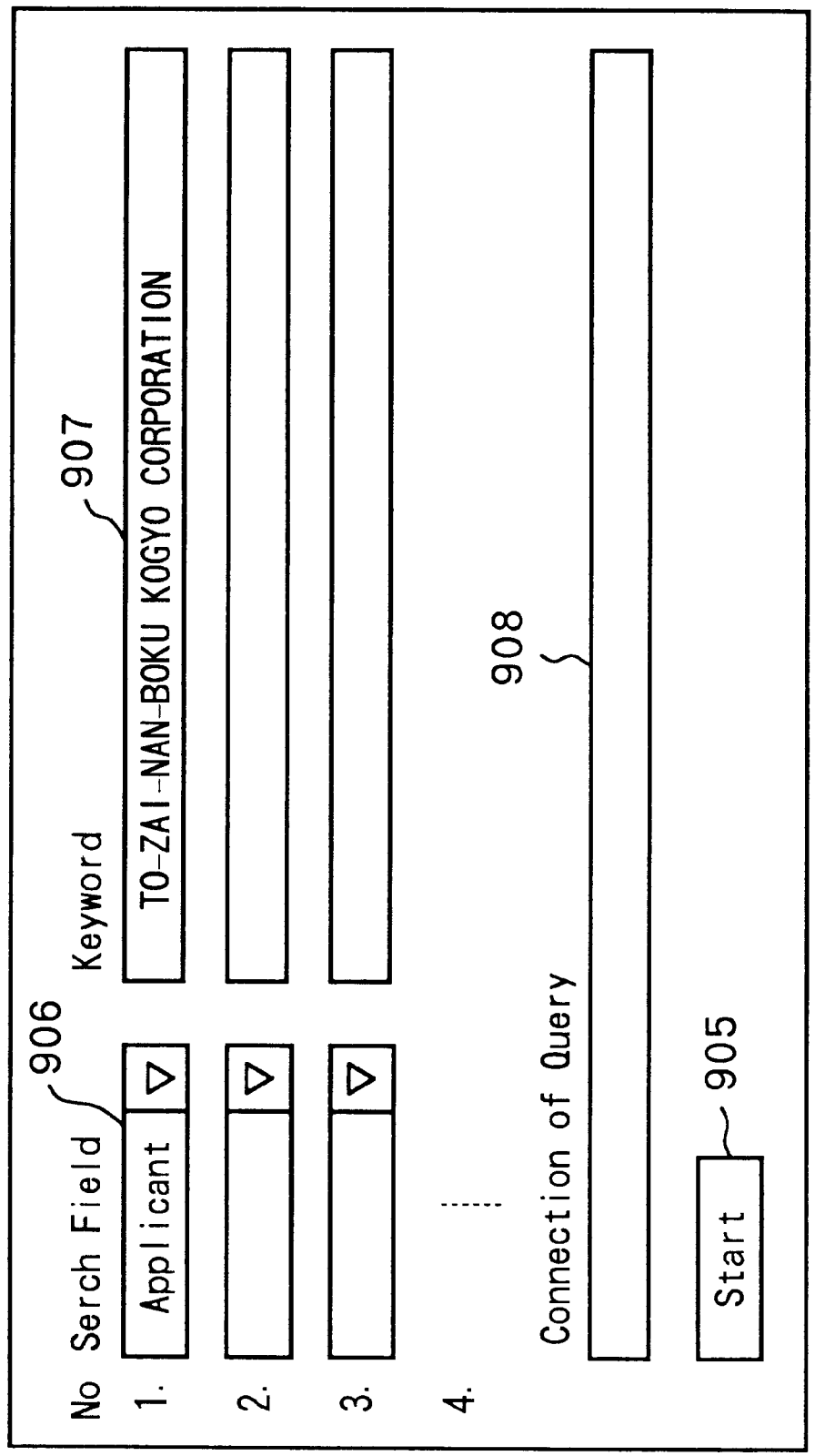

FIG.10A

| | 1002 | 1003 | 1004 | 1005 | 1001 | 1016 |
|---|---|---|---|---|---|---|
| | Publication number | Invention name | Inventor | Applicant | | check |
| 1. | 01123456 | xxx | xxx | xxx | xxx | ☐ |
| 2. | | | | | | ☐ |
| 3. | | | ..... | | | ☐ |
| 4. | | | | | | ☐ |
| 5. | | | | | | ☐ |

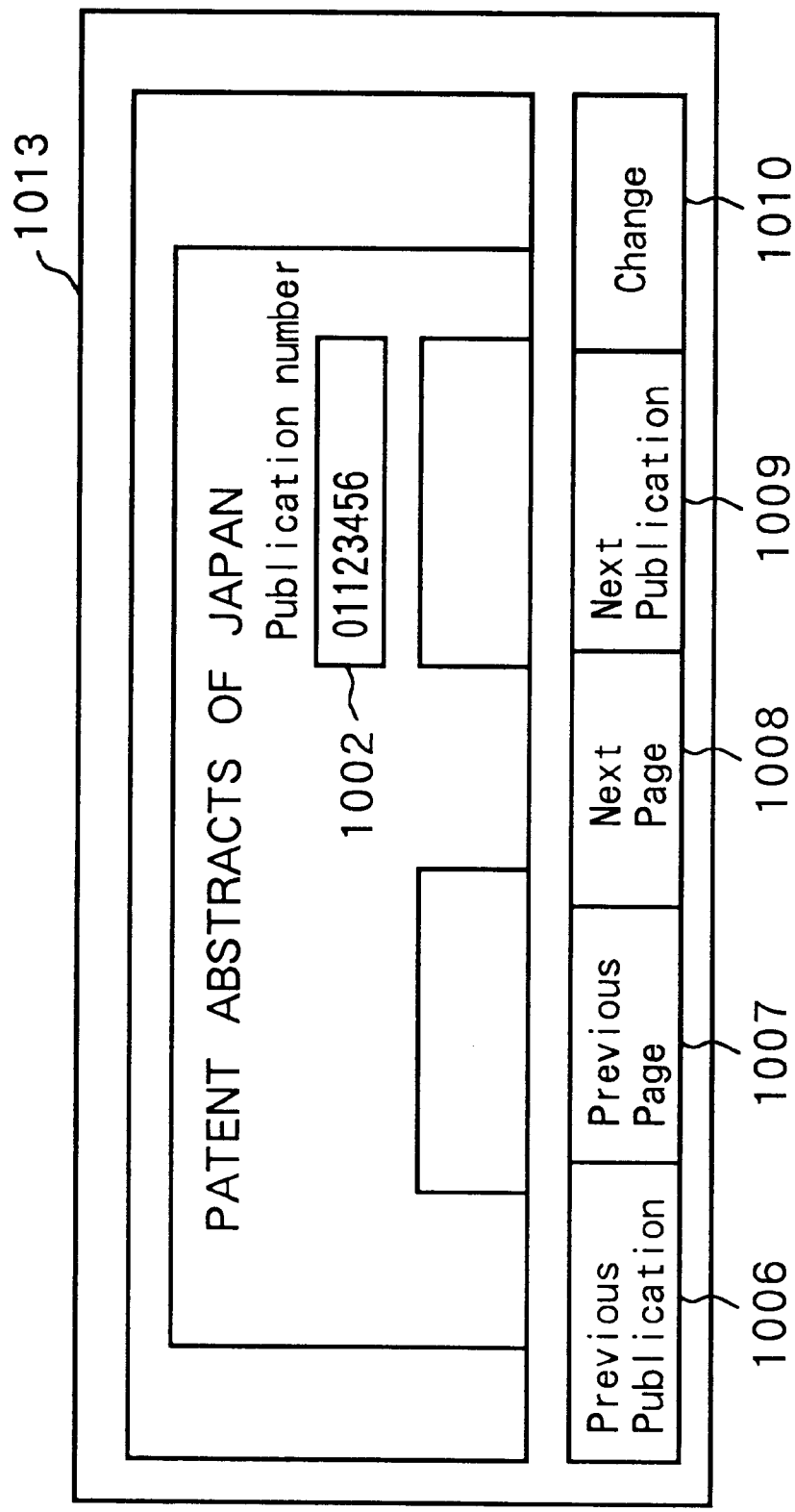

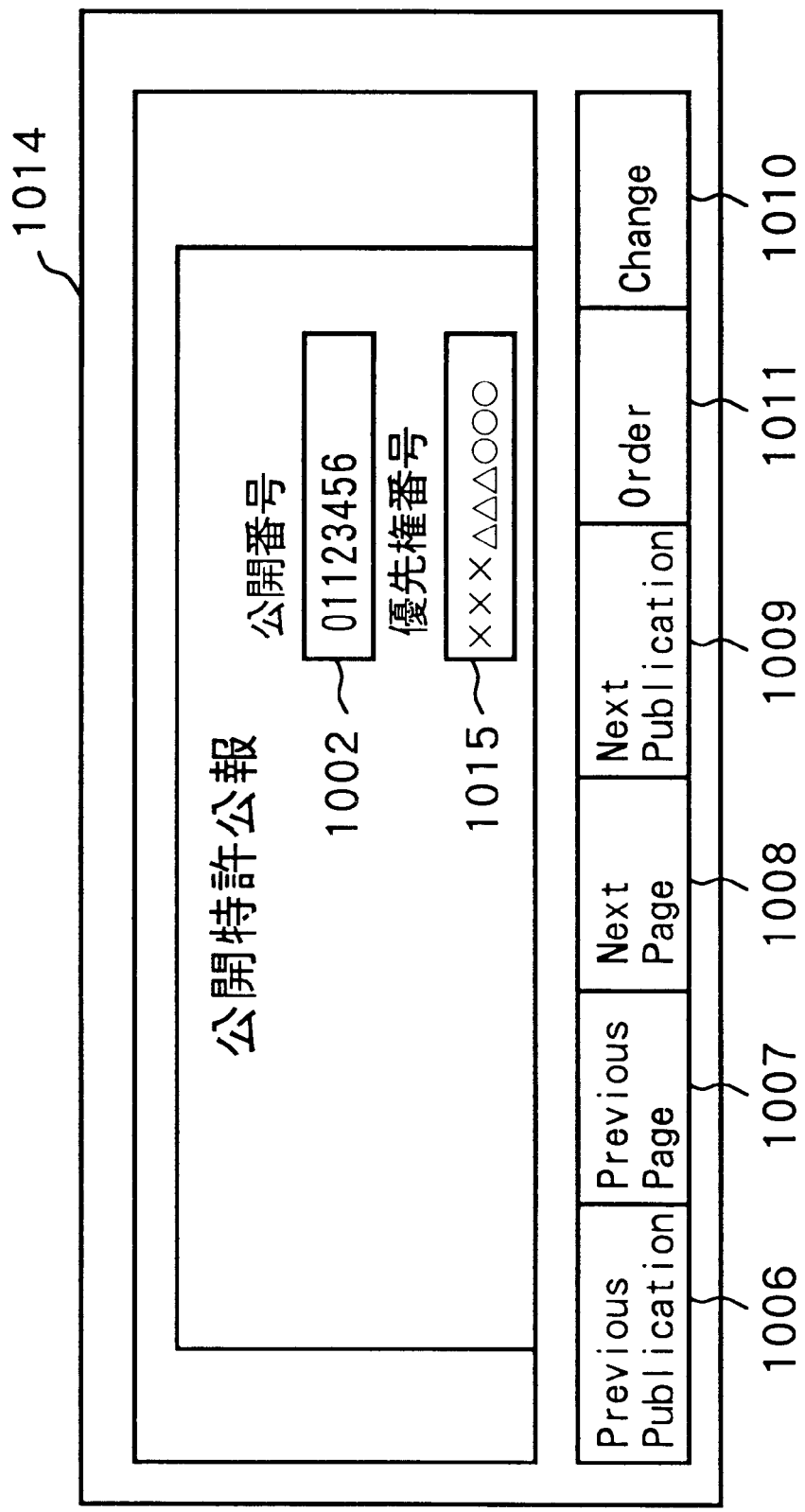

FIG.11A

| 公開特許番号 | 発明の名称 | 出願人 | テキスト | ...... |
|---|---|---|---|---|
| 01123456 | ××× | 東西南北工業株式会社 | ××× | ××× |
| ........ | ........ | ........ | ........ | ........ |

1002　1101

TABLE ARRANGEMENT OF FULL TEXT SEARCH DATABASE
(TABLE NAME:FULL TEXT SEARCH)

FIG.11B

| Publication number | Invention Title | Applicant | TEXT | ...... |
|---|---|---|---|---|
| 01123456 | ××× | TO-ZAI-NAN-BOKU KOGYO CORPORATION | ××× | ××× |
| ...... | ...... | ...... | ...... | ...... |

1002, 1102

TABLE ARRANGEMENT OF ENGLISH ABSTRACT DATABASE
(TABLE NAME: ABSTRACT)

| WORD | SYNONYM 1 | SYNONYM 2 | ......... |
|------|-----------|-----------|-----------|
| 通信 | 伝送 | 電送 | 伝達 |
| 暗号 | 暗号 | 暗号化 | |
| ⋮ | ⋮ | ⋮ | ⋮ |
| | | | |

ARRANGEMENT OF SYNONYM TABLE

| ENGLISH WORD | CORRESPONDING JAPANESE WORD |
|--------------|-----------------------------|
| Cipher | 暗文 |
| communicate | 通信 |
| encode | 暗号化 |
| cryptography | 暗号 |
| Applicant | 出願人 |
| ⋮ | ⋮ |
| | |

ARRANGEMENT OF WORD REPLACEMENT TABLE

FIG.13A

| Applicant | Japanese of Applicant |
|---|---|
| TO-ZAI-NAN-BOKU KOGYO CORPORATION | 東西南北工業株式会社 |
| ⋮ | ⋮ |
| | |

ARRANGEMENT OF APPLICANT REPLACEMENT TABLE

FIG.13 B

| JAPANESE WORD | CORRESPONDING ENGLISH WORD |
|---|---|
| 図 | Figure |
| 表 | Chart |
| 化 | Chemical formula |
| ⋮ | ⋮ |
| | |

ARRANGEMENT OF CONVERSION TABLE

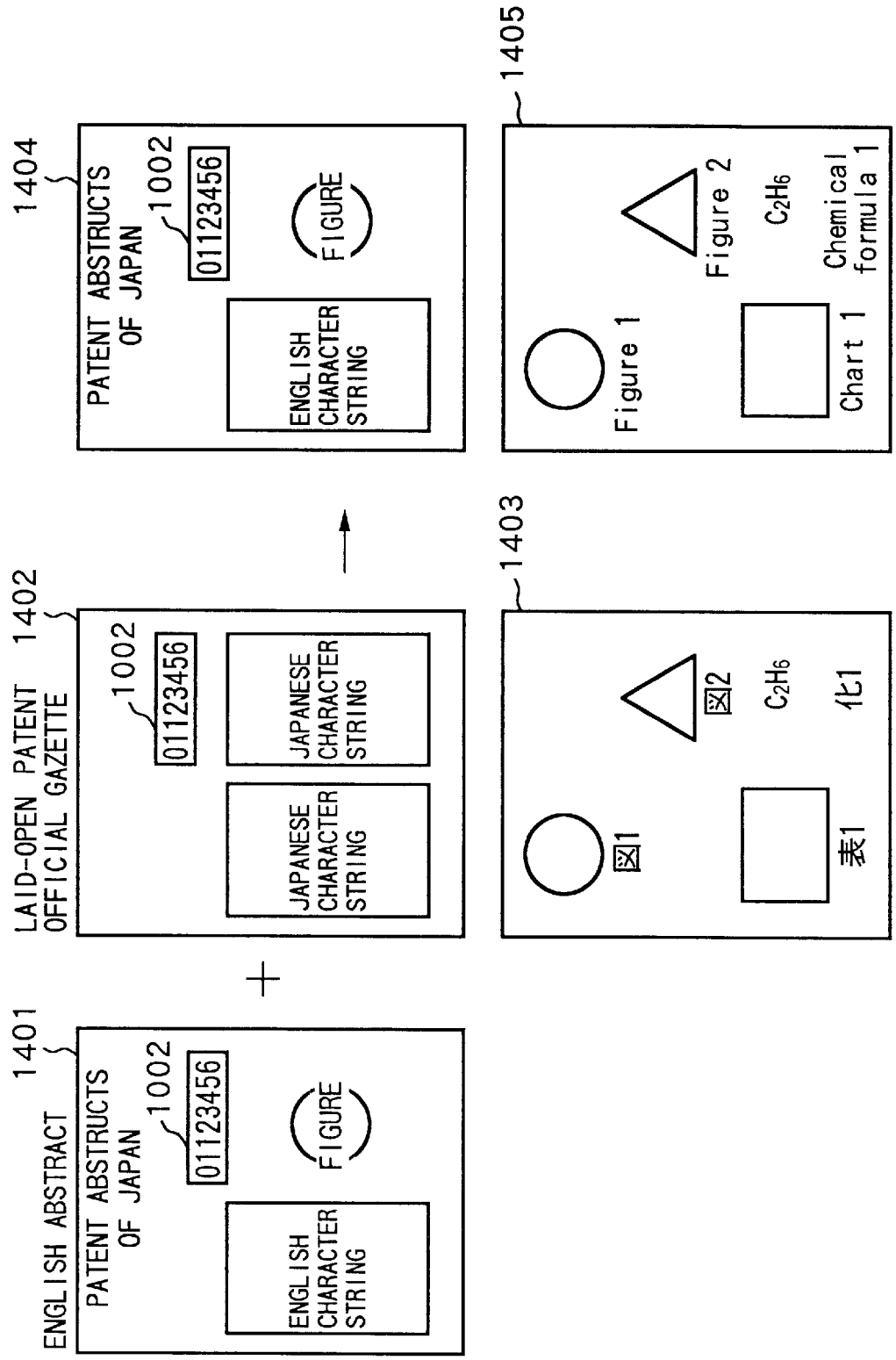

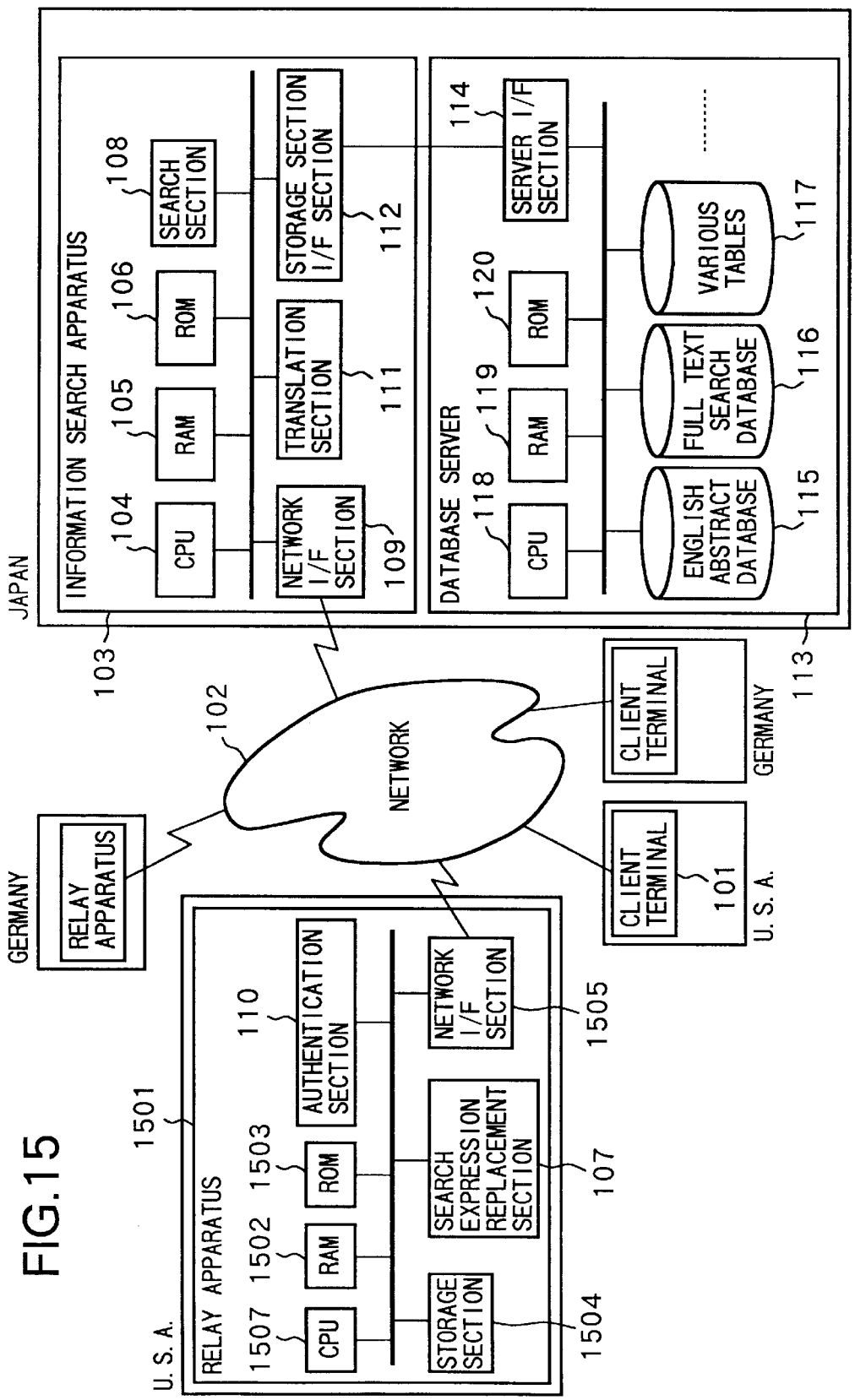

| WORD | FREE KEYWORD | FREE KEYWORD CODE |
|---|---|---|
| transmission | 送信 | F302677 |
| transmission | 伝送 | F344282 |
| transmission | 伝達 | F344356 |
| transmission | 伝達文 | F344404 |
| transmission | 伝達品 | F344401 |
| transmission | 変速機 | F404307 |
| ⋮ | ⋮ | ⋮ |
|  |  |  |

ARRANGEMENT OF FREE KEYWORD TABLE

| US-CL | IPC |
|---|---|
| 340 | B60Q |
| 362 | B60Q |
| ⋮ | ⋮ |
|  |  |

ARRANGEMENT OF IPC CONVERSION TABLE

MULTILINGUAL PATENT INFORMATION SEARCH SYSTEM

BACKGROUND OF THE INVENTION

The present invention relates to a multilingual patent information search system and apparatus, and a control method therefor and, more particularly, to a patent information search system and apparatus for searching a database storing predetermined information on the basis of, e.g., an input keyword, and a control method therefor.

Along with recent development of communication networks including the Internet, information must be inevitably published in different linguistic areas. For example, as services for publishing information, search systems for searching databases storing information associated with Japanese patents or utility models through networks have been proposed. Necessary information can be easily obtained by accessing the above-described search systems from personal computers at home or the like.

For example, a document search system disclosed in Japanese Patent Laid-Open No. Hei 5-324791 translates an input English keyword into a Japanese keyword and then searches for Japanese document files on the basis of this Japanese keyword.

A search system disclosed in Japanese Patent Laid-Open No. Hei 6-180718 has English and Japanese dictionaries of synonyms. This system translates an input keyword of a foreign language into a corresponding Japanese keyword and searches the databases using this keyword.

In a database search method disclosed in Japanese Patent Laid-Open No. Hei 5-233696, an English database is prepared. A Japanese keyword is translated into an English keyword using a table representing the correspondence between original and translation words, and the database is searched.

A system disclosed in Japanese Patent Laid-Open No. 3-278268 has a knowledge base formed in a predetermined language, a database formed in a language different from the language of the knowledge base, and a dictionary means for performing translation between the database language and the knowledge base language. An "OR" relationship is set between a keyword input to the dictionary means in the knowledge base language and a plurality of keywords output in the database language, thereby searching the database.

A document search/display system disclosed in Japanese Patent Laid-Open No. 8-202721 searches for documents on the basis of a received keyword, translates the searched documents, and displays them.

However, the above-described prior arts have the following problems.

In the above-described search systems, for example, when a foreigner wants to search for information associated with Japanese patents or utility models, the following disadvantages may occur.

As the first problem, a formal applicant name in a foreign country (e.g., "SUBARU") is sometimes different from that in Japan (e.g., "富士重工 (Fuji Jukoh)"). For example, when a foreigner searches a database storing U.S. patent information using the formal applicant name in U.S.A. (e.g., "SUBARU") as a search key, he/she can obtain desired information. However, when a database storing Japanese patent information is searched using the above-described search key, desired information cannot be obtained.

This is because the search key is different, as a matter of course. In this case, the foreigner must check the formal applicant name in Japan and then search the database storing Japanese patent information and the like. However, for foreigners who cannot understand Japanese, it is difficult to check the formal applicant name in Japan. In addition, to use the search system capable of searching for Japanese patent information and the like, very cumbersome operations including input of Japanese words are required.

As the second problem, when a foreigner has searched a database storing Japanese patent information and the like, the contents of searched information are hard to understand. This is because the obtained information is expressed in Japanese. To understand the contents of the searched information, it must be translated into a language that can be understood by the foreigner.

As described above, patent bibliographic information are important in narrowing down objects to be searched for. However, patent issuing countries employ unique description schemes for bibliographic information, and this makes it difficult for foreigners to access patent databases.

SUMMARY OF THE INVENTION

The present invention has been made to solve the above problems, and has as its object to provide a patent information search system and apparatus which can be easily used by foreigners, and a search method therefor.

The present invention has the following arrangement as a means for achieving the above object.

According to claim 1, there is provided a patent information search system having a patent information processing apparatus for inputting a search expression for searching for patent information, and a patent information search apparatus for searching a patent information database storing patent information such as bibliographic information on the basis of a predetermined search expression, the patent information processing apparatus comprising:
  means for inputting a first search expression;
  search expression replacement means for replacing the input first search expression with a second search expression suitable for search by the patent information search apparatus on the basis of bibliographic information search contents of the first search expression; and
  first transmission means for transmitting the replaced second search expression to the patent information search apparatus, and the patent information search apparatus comprising:
  search means for searching the patent information database on the basis of the received second search expression; and
  second transmission means for transmitting a search result to the patent information processing apparatus.

When components in the search expression are replaced, the ambiguity between different languages or different search expressions can be eliminated, unlike conventional translation. Hence, even when a search expression in a foreign language is input, accurate search can be executed.

If the user is a foreigner, his/her language must be automatically known. For this purpose, according to claim 2 as a preferred aspect of the present invention, the patent information search apparatus further comprises determination means for determining a language that can be understood by a user who has generated the first search expression, on the basis of unique information for specifying the user.

If the user is a foreigner, the searched data is preferably translated. Especially according to claim 3 as a preferred aspect of the present invention, the patent information search apparatus further comprises translation means for translating patent information so as to translate a character string contained in a figure into a character string in the language that can be understood by the user. Only by partially translating the figure, a large quantity of information can be given to a foreigner.

If the user is a foreigner, the searched data is preferably translated. Especially according to claim 4 as a preferred aspect of the present invention, the patent information search apparatus is connected, through a network, to a translation server for translating patent information, and comprises translation request issuing means for issuing a request to translate the search result from the search means into the language that can be understood by the user.

When translation is executed outside the system, the load on the system decreases.

According to claim 5 as a preferred aspect of the present invention, the replacement means has a replacement table for replacing components of the first search expression with components of the second search expression in a language of the database.

Replacement using the table is efficient.

According to claim 6 as a preferred aspect of the present invention, the replacement table contains at least one of a table for replacing an applicant name in the first search expression with an applicant name described in the language of the database, and a table for replacing a patent classification code in the first search expression with a patent classification code of the database.

According to claim 7 as a preferred aspect of the present invention, the patent information database stores at least information associated with English abstracts, free keywords, F-term codes, and International Patents Classification, which correspond to official gazettes of patents, utility models, designs, and trademarks.

According to claim 8 as a preferred aspect of the present invention, the bibliographic information used in the search expression contains at least one of an applicant name, a patent classification, a publication number, a publication date, an application number, an application date, an official gazette type, and a country of priority claim.

The U.S.A. does not employ the International Patents Classification. Hence, according to claim 9 as a preferred aspect of the present invention, the bibliographic information in the search expression is replaced between the U.S. Patents Classification and the International Patents Classification.

According to claim 10 as a preferred aspect of the present invention, the replacement table replaces the bibliographic information in the search expression between a date in the Japanese year and a date in the dominical year. This is because a data in the Japanese year cannot be translated into a date in the dominical year.

According to claim 11 as a preferred aspect of the present invention, the bibliographic information contains at least one of information associated with an examination procedure, information associated with an appeal procedure, and information associated with registration.

According to claim 12 as a preferred aspect of the present invention, the patent information processing apparatus comprises a client terminal connected to the patent information search apparatus through a network.

The patent information processing apparatus can be divided into various forms. For example, according to claim 13 as a preferred aspect of the present invention, the patent information processing apparatus can be divided into a computer information processing apparatus connected to the patent information search apparatus and including at least the replacement means and the first transmission means, and a client terminal connected to the computer information processing apparatus through a network and having the input means.

The patent information processing apparatus can be divided into various forms. For example, according to claim 14 as a preferred aspect of the present invention, the patent information processing apparatus can be divided into a patent information database as the patent information search apparatus, the replacement means and first transmission means, a computer information processing apparatus connected to the patent information database, the replacement means, and the first transmission means through a bus, and a plurality of client terminals each connected to the computer information processing apparatus through a communication network and having the input means.

To apply the present invention, most terminals preferably comprise existing terminals. According to claim 15 as a preferred aspect of the present invention, the client terminal comprises an emulator terminal of the patent information search apparatus.

According to claim 16 as a preferred aspect of the present invention, the patent information processing apparatus comprises display means for displaying the search result in a form that can be understood by the user.

According to claim 17 as a preferred aspect of the present invention, the display means comprises means for translating the search result into the language that can be understood by the user by machine translation.

A foreign user can readily understand the search result by only adding an English abstract. Hence, according to claim 18 as a preferred aspect of the present invention, the display means displays the search result added with an existing English abstract.

According to claim 19 as a preferred aspect of the present invention, the computer information processing apparatus incorporates a translation engine.

When patent information to be searched for has priority claim, a foreign user can directly use the patent information of base priority. Conversely, if the patent information is a Japanese application, an English abstract is required. Hence, according to claim 20 as a preferred aspect of the present invention, when the search result from the search means represents that a country of priority claim is a country using the language of patent information for the search means, the information processing apparatus generates a command for causing the search means to search for an English abstract and receives a processing result from the search means according to the command from the search means.

Similarly, according to claim 21 as a preferred aspect of the present invention, when the search result from the search means represents that a country of priority claim is a country using the language of patent information for the search means, the patent information search apparatus searches for a corresponding English abstract and transmits the searched English abstract to the patent information processing apparatus.

Conversely, according to claim 22 as a preferred aspect of the present invention, when the search result from the search means represents that a country of priority claim is a country using a language other than the language of patent information for the search means, the patent information processing apparatus generates a link to a network to the country of priority claim and returns the link to the network to the user.

According to claim 23 as a preferred aspect of the present invention, in the patent information search system of claim 22, the link to the network is an URL address.

According to claim 24 as a preferred aspect of the present invention, the patent information processing apparatus has a terminal for displaying a processing result associated with priority claim.

In order to achieve the above object, the present invention can be applied to networks in various forms. When the present invention is applied to an information search relay apparatus inserted, through a network, between a plurality of terminal devices and a patent information search apparatus for storing and searching for patent information, the relay apparatus comprises search expression replacement means for replacing a first search expression input from the plurality of terminal devices with a second search expression suitable for search by the patent information search apparatus on the basis of bibliographic information search contents of the first search expression;

first transmission means for transmitting the replaced second search expression to the patent information search apparatus; and relay means for receiving a search result according to the second search expression by the patent information search apparatus from the patent information search apparatus and relaying the search result to the plurality of terminals, as in claim 25.

According to the relay apparatus of claim 26 as a preferred aspect of the present invention, the patent information search apparatus has an existing patent information database described in a language different from a language of the first search expression.

As the characteristic feature of the relay apparatus, a plurality of users access the apparatus. Therefore, a new data base can be constructed in the relay apparatus. The relay apparatus of claim 27 as a preferred aspect of the present invention further comprises means for sequentially storing search results received from the patent information search apparatus to form a database, and means for searching the new database using the replaced second search expression, and when no result is obtained from the new database, the first transmission means transmits the replaced second search expression to the patent information search apparatus.

The above object can also be achieved by a patent information search apparatus according to claim 28, for searching a patent information database on the basis of an input search expression and outputting a search result, comprising:

replacement means for replacing an input first search expression with a second search expression for searching the patent information database, on the basis of bibliographic information search contents of the search expression.

The above object can also be achieved by a search method of any one of claims 29 to 57.

The above object can also be achieved by a storage medium of any one of claims 29 to 57.

In the above search apparatus or method, the patent information database can be searched on the basis of information other than bibliographic information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2B is a flow chart for explaining overall processing of the client terminal 101;

FIG. 9A is a view showing an example of an input window in Simple Search;

FIG. 9B is a view showing an example of the input window in Expert Search;

FIG. 10A is a view showing an example of search result display;

FIG. 10B is a view showing another example of search result display;

FIG. 10C is a view showing still another example of search result display;

FIG. 11A is a view showing the table layout of a full text search DB;

FIG. 11B is a view showing the table layout of an English abstract DB;

FIG. 12A is a view showing the arrangement of a synonym table;

FIG. 12B is a view showing the arrangement of a word replacement table;

FIG. 13A is a view showing the arrangement of an applicant replacement table;

FIG. 13B is a view showing the arrangement of a conversion table;

FIG. 14 is a view showing a synthesis result of an English abstract and drawings;

FIG. 15 is a block diagram showing another arrangement of a patent information search system according to the present invention;

FIG. 16A is a view showing the arrangement of a free keyword table; and

FIG. 16B is a view showing the arrangement of an IPC conversion table.

DETAILED DESCRIPTION OF THE INVENTION

The embodiments of a patent information search system and apparatus, and a control method therefor of the present invention will be described below with reference to the accompanying drawings.

First Embodiment

Figure 1:
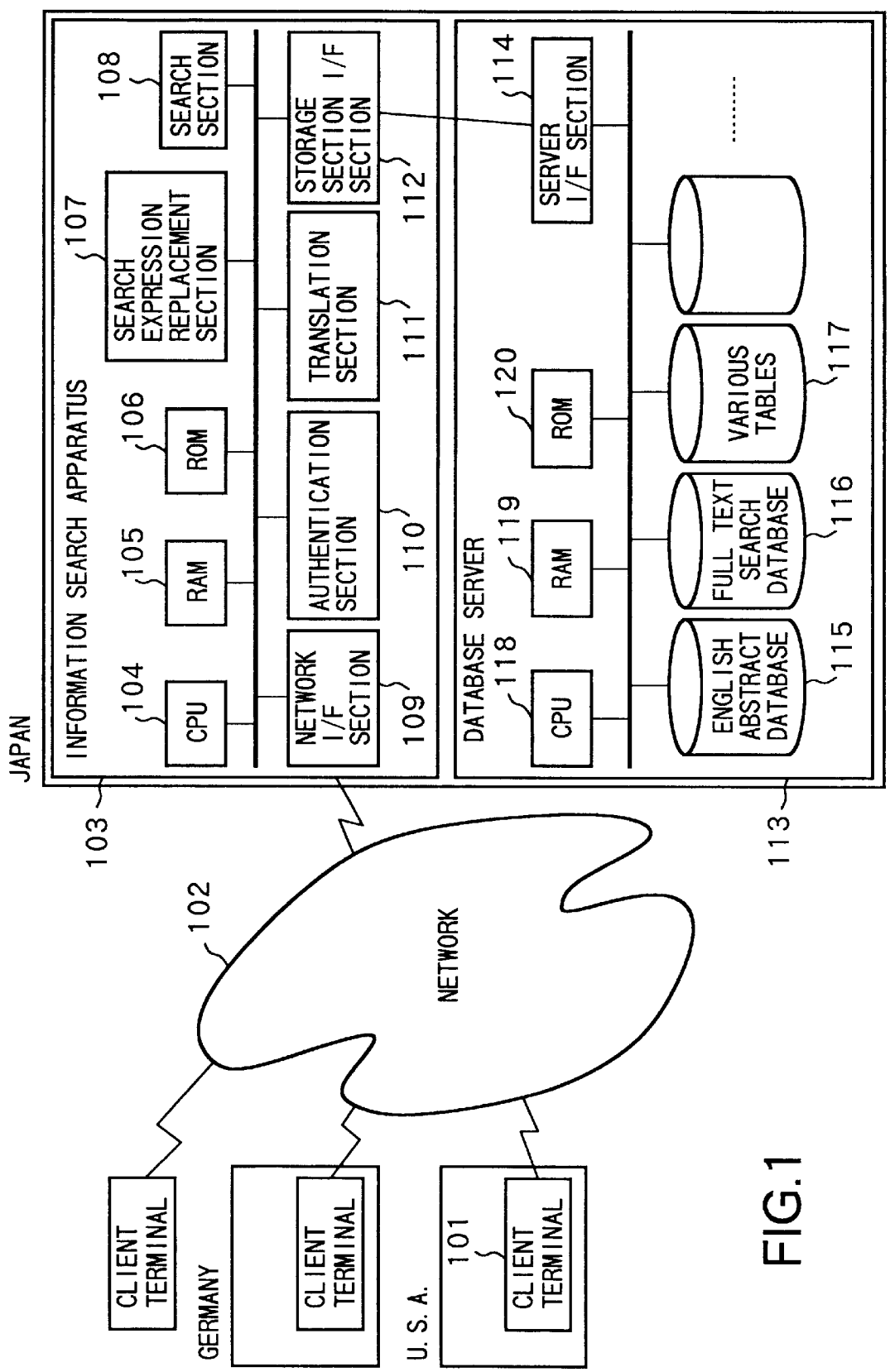
FIG. 1 is a block diagram showing an arrangement of a patent information search system according to the present invention.
Figure 2A:
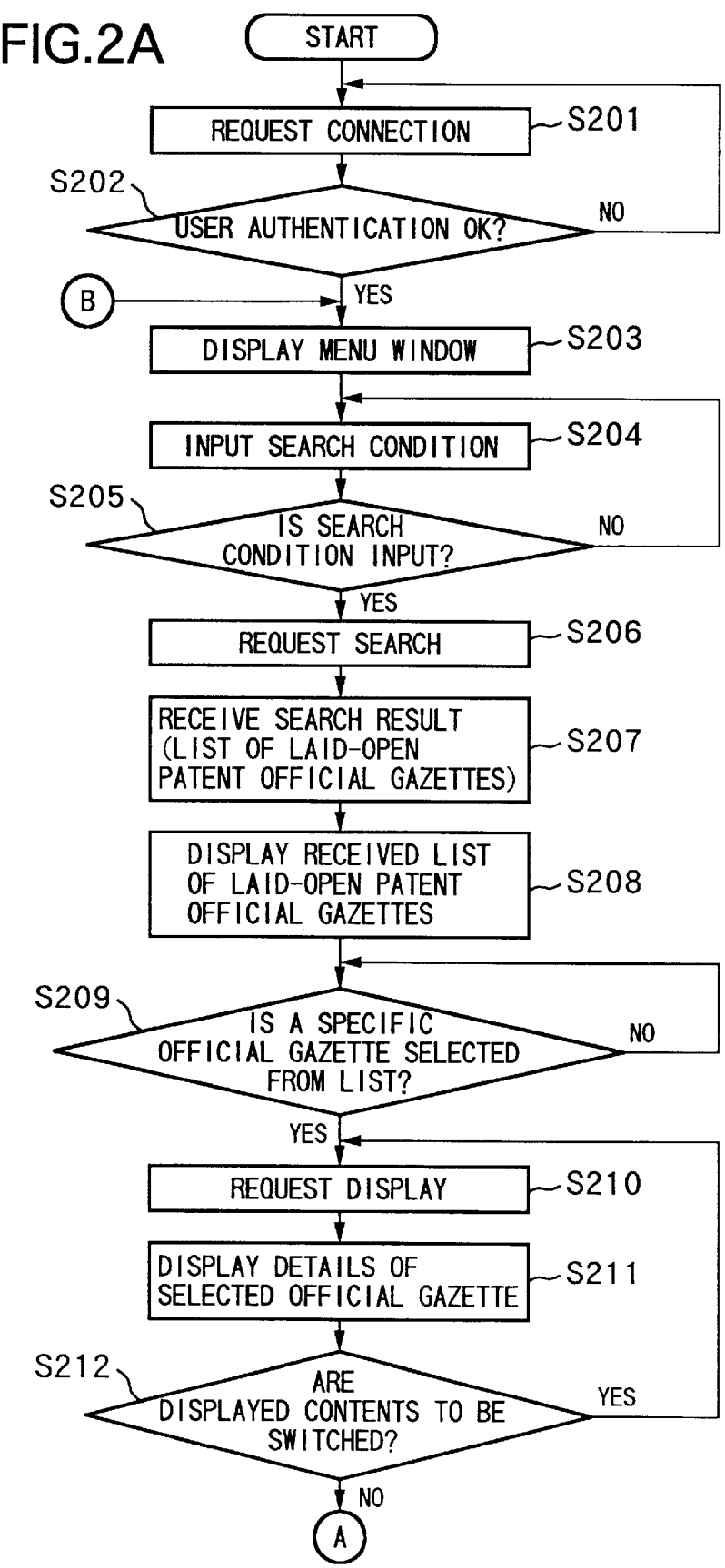
FIG. 2A is a flow chart for explaining overall processing of a client terminal 101.
Figure 3:
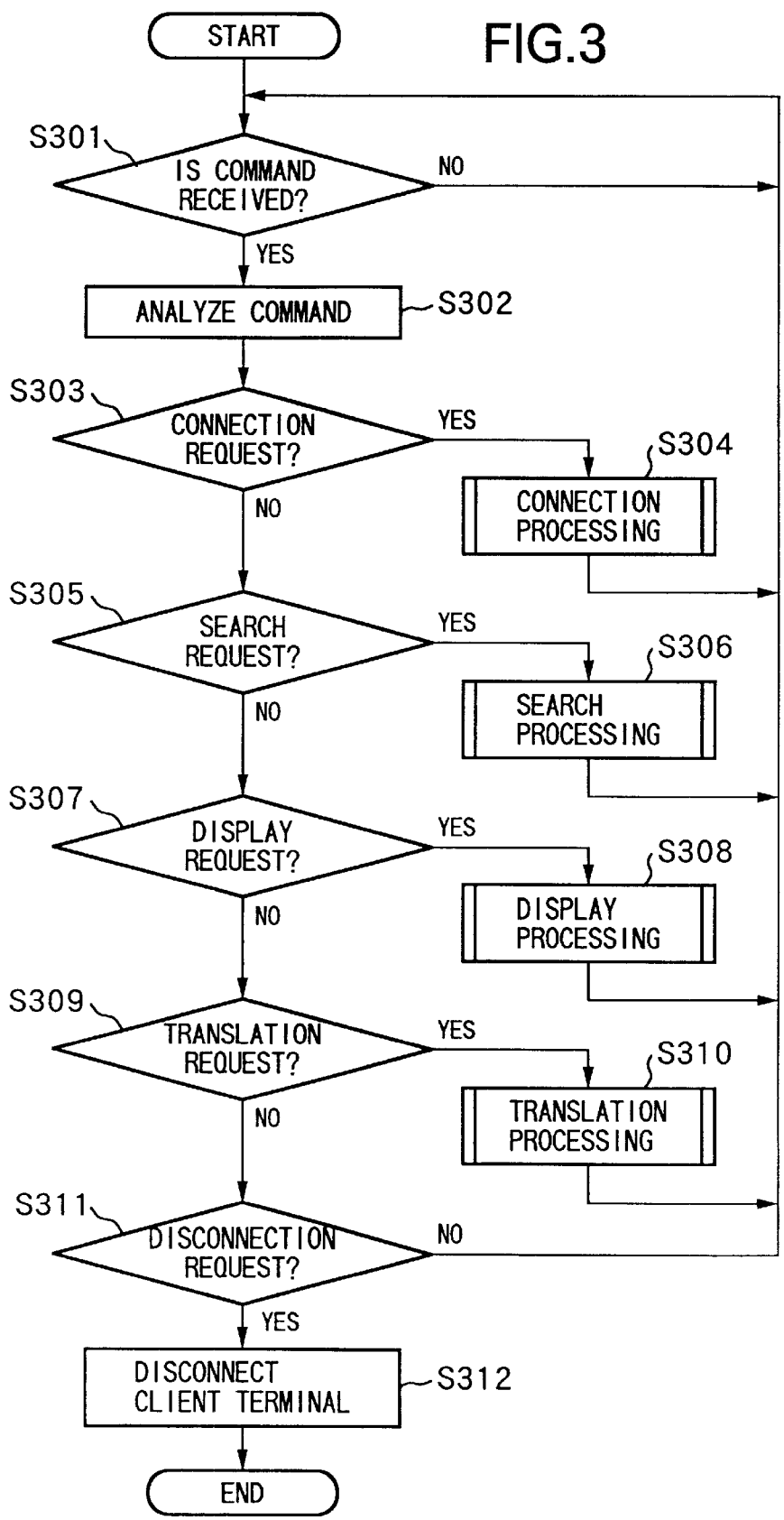
FIG. 3 is a flow chart for explaining overall processing of a patent information search apparatus 103.

FIG. 1 is a block diagram showing an arrangement of a patent information search system according to an embodiment of the present invention. A client terminal 101 is connected to a patent information search apparatus 103 through a network 102 (e.g., the Internet). This client terminal 101 is a terminal emulator which receives a command from the information search apparatus 103 and displays it. The command has a display field. When the user inputs data in a desired field displayed on the terminal, the terminal directly returns the input data and field to the search apparatus 103.

The patent information search apparatus 103 is a server for searching for patent information and the like which are filed in, e.g., Japan, and searches various databases (115, 116, and 117) storing Japanese patent information and the like in response to a request from the client terminal 101. A CPU 104 controls the entire patent information search apparatus 103 on the basis of control programs in a ROM 106. A RAM 105 is used as, e.g., a work area in executing a control program or the like stored in the ROM 106.

A search expression replacement section 107 analyzes a search condition transmitted from the client terminal 101 and replaces it with a search expression to search the various databases (115, 116, and 117).

A search section 108 searches the various databases (115, 116, and 117) on the basis of the generated search expression. A network interface section 109 is an interface section for connecting the apparatus to the network 102.

An authentication section 110 determines whether the user of the client terminal 101 has been permitted to use the patent information search apparatus 103. The authentication section 110 also manages charge for fee claiming to the user of the patent information search apparatus 103.

A translation section 111 requests to translate information obtained upon searching the various databases (115, 116, and 117) into a predetermined language. A storage section interface 112 is an interface section for connecting the apparatus to a database server 113.

This patent information search apparatus 103 incorporates a translation engine or tool (not shown). The translation section 111 issues the request to this translation engine. The translation means is not limited to the internal translation engine or tool. For example, an external translation server may be used. To request an external translation server for translation, the translation section 111 sends the translation request to the server via a communication line together with a text to be translated and receives the translation result.

The database server 113 comprises a CPU 118 for controlling the entire database server 113, a ROM 120 storing control programs and the like for controlling the database server 113, a RAM 119 used as, e.g., a work area in executing a control program or the like stored in the ROM 120, and the various databases (115, 116, and 117) storing Japanese patent information and the like.

The English abstract database 115 stores English abstracts corresponding to laid-open patent official gazettes as one of patent information. The full text search database 116 stores laid-open patent official gazettes (Japanese) and the like associated with patents filed in Japan.

The database 117 stores various tables such as a synonym table 1201, a word replacement table 1202, an applicant replacement table 1301, a conversion table 1302, a free keyword table 1601, and an IPC replacement table 1602.

The database server 113 shown in FIG. 1 is independent of the patent information search apparatus 103. However, the present invention is not limited to this. The arrangement and function of the database server 113 may be integrated with the patent information search apparatus 103.

According to the patent information search system of the present invention, a person (to be referred to as a "user" hereinafter) who uses a native language (e.g., English) other than Japanese can easily search for information related to patents filed in Japan from the database server 113 using a terminal device set abroad or a foreign-language terminal device in Japan.

For this purpose, the client terminal 101 has an interpreter that understands, e.g., the HTML language. When the HTML language is used, for example, the HTTP protocol is applied to the client terminal 101 and information search apparatus 103. An arbitrary program can be used between the client terminal 101 and the information search apparatus 103. For example, when the information search apparatus 103 can process PATOLIS data, an arbitrary terminal for emulating a PATOLIS terminal can be used.

Access from a user in abroad to the database server 113 will be described below in detail with reference to the flow charts in FIGS. 2 to 7.

Figure 8:
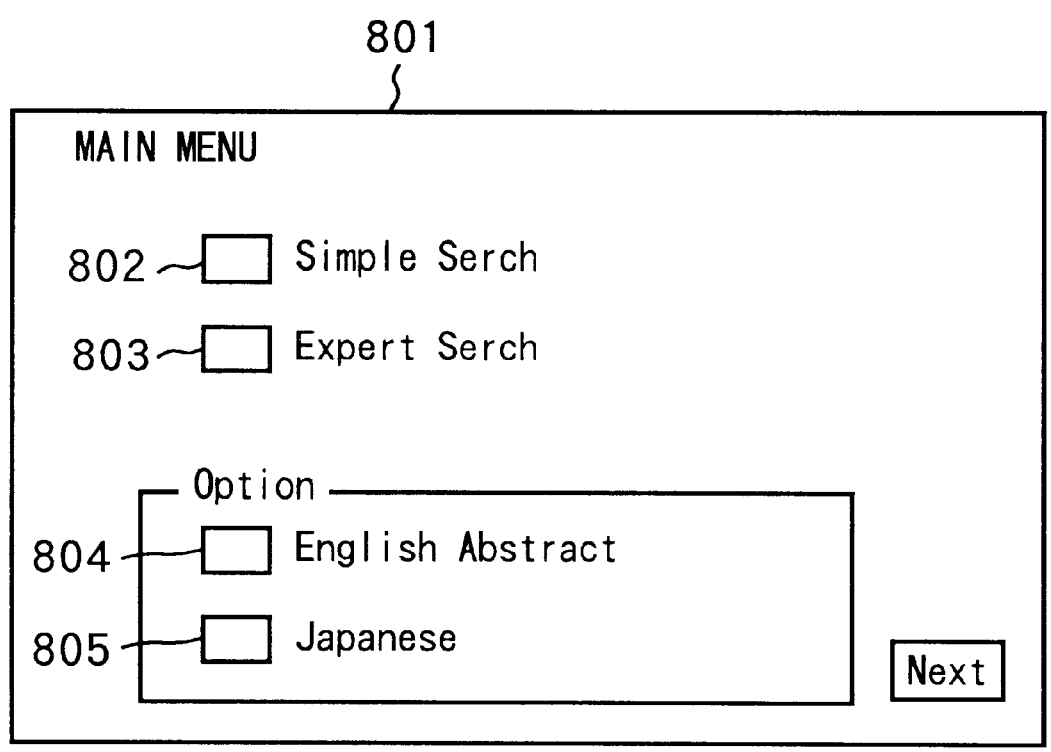
FIG. 8 is a view showing an example of a menu window.

To connect the patent information search apparatus 103, the user inputs a user ID and a password using the client terminal 101 to request the patent information search apparatus 103 for connection (step S201). When user authentication by the patent information search apparatus 103 is complete, and use of the patent information search apparatus 103 is permitted, the patent information search apparatus 103 transmits a menu window for input to the terminal 101. The client terminal 101 displays the menu window transmitted from the patent information search apparatus 103 (step S203). A menu window 801 has a layout as shown in FIG. 8. Each item is described in English. As will be described later, the search apparatus 103 determines on the basis of the user login information whether the user is in Japanese or English zone. When the user is a user in English zone, a menu as shown in FIG. 8 is sent.

On the displayed menu window 801, the user selects "Simple Search" 802 or "Expert Search" 803, designates an "Option" item, and inputs a search condition (step S204). The "Simple Search" is used to search for patent information stored in the database (115, 116, or 117) on the basis of an arbitrary English word input by the user, and has a menu layout as shown in FIG. 9A. The "Expert Search" is used to search for patent information stored in the database (115, 116, or 117) after the search range is narrowed down to, e.g., search for only an applicant designated by the user from patent applicants, and has a menu layout as shown in FIG. 9B.

The menu window 801 has check boxes (804 and 805) for designating a database to be searched. When "English Abstract" is checked, the English abstract database 115 (to be referred to as the "English abstract DB" hereinafter) is accessed. When "Japanese" is checked, the full text search database 116 (to be referred to as the "full text search DB" hereinafter) is accessed. The above-described English abstract DB 115 stores English abstracts corresponding to laid-open patent official gazettes as one of patent information. The full text search DB 116 stores laid-open patent official gazettes (Japanese) and the like associated with patents filed in Japan.

The English abstract DB 115 and full text search DB 116 are, e.g., relational databases and have table layouts as shown in FIGS. 11B and 11A, respectively. The English abstract DB 115 and full text search DB 116 are related to each other on the basis of, e.g., "publication numbers" 1002.

In the first embodiment, for the descriptive convenience, databases which can be searched are limited to the English abstract DB 115 and full text search DB 116. However, the present invention is not limited to this. For example, not only databases associated with patents but also databases of utility models, designs, and trademarks can also be handled. The database language is not limited to Japanese.

Referring back to FIG. 2A to explain the control procedure, it is determined whether a search condition is input by the user (step S205). If no search condition is input yet, the flow returns to step S204 to wait for search condition input by the user.

When a search condition is input by the user, the patent information search apparatus 103 sends the menu window in FIG. 9A (for Simple Search) or in FIG. 9B (for Expert Search), as will be described later. The user requests the patent information search apparatus 103 for search using this window. In inputting the search request, when the patent information search condition is input and then a "START" button 905 is clicked by the user on the window shown in FIGS. 9A or 9B, a command is issued to the patent information search apparatus 103.

The search apparatus 103 performs search in response to this command and returns the search result to the terminal 101.

The search result is received from .the patent information search apparatus 103 (step S207). As shown in FIG. 10A, the received search result is displayed on the monitor of the client terminal 101 as a list of records (step S208). As is apparent from FIG. 10A, the search result includes a plurality of searched applications as a list. A displayed list 1001 displays only pieces of information such as the publication numbers 1002, invention titles 1003, inventors 1004, and applicants 1005. Hence, detailed contents of an invention cannot be grasped from this list 1001.

In this case, the user clicks (designates) a portion near the desired publication number 1002 in the list 1001 displayed on the screen using a mouse or the like, thereby requesting the patent information search apparatus 103 to display, e.g., a laid-open patent official gazette corresponding to the designated publication number 1002 (step S210). In accordance with this display request, a command for requesting various patent information (e.g., a laid-open patent official gazette) corresponding to the desired publication number 1002 is issued to the patent information search apparatus 103.

When an option for searching the English abstract DB 115 is selected in step S204, an English abstract corresponding to the clicked publication number 1002 can be obtained in a display form as shown in FIG. 10B (step S211). When an option for searching the full text search DB 116 is selected in step S204, a laid-open patent official gazette corresponding to the clicked publication number 1002 can be obtained in a display form as shown in FIG. 10C (Step S211).

The user may switch a displayed Japanese laid-open patent official gazette 1014 (FIG. 10C) to an English abstract. In this case, the user clicks a "CHANGE" button 1010 (FIG. 10C) to display an English abstract 1013 corresponding to the displayed laid-open patent official gazette 1014 on the monitor. If the English abstract 1013 corresponding to the displayed laid-open patent official gazette 1014 is not present in the English abstract DB 115, a message is displayed on the monitor to notify the user of it.

To switch the English abstract 1013 displayed on the monitor to a Japanese laid-open patent official gazette, the "CHANGE" button 1010 is clicked to display the laid-open patent official gazette 1014 corresponding to the displayed laid-open patent official gazette 1014 on the monitor.

The pieces of information obtained by searching the patent information search apparatus 103 include not only English information as shown in FIG. 10B but also Japanese information as shown in FIG. 10C. However, the Japanese information is not effective information for a user who cannot understand Japanese. The patent information search system of the present invention is constituted such that the user can request the translation server of an external translation agency (or the translation engine incorporated in the patent information search apparatus 103) to translate the laid-open patent official gazette described in Japanese into a language that can be understood by the user (step S215). For the translation request, when an "ORDER" button 1011 in FIG. 10C is clicked, a command for requesting translation is issued to the patent information search apparatus 103 to estimate the translation fee or order translation.

In addition, in the patent information search system of the present invention, when a foreign country has the priority right for the invention described in the displayed laid-open patent official gazette in FIG. 10C, a priority number 1015 is clicked (step S216) to link databases in the priority country (step S217) and display a corresponding official gazette. In this case, the priority number 1015 and the databases in the priority country can be linked by forming the display window 1014 using HTML or the like.

Processing on the client terminal 101 side in searching for Japanese patent information and the like has been described above in detail. Next, processing on the patent information search apparatus 103 side will be described in detail.

The patent information search apparatus 103 monitors a command sent from the client terminal 101 (step S301), and upon receiving a command, analyzes the received command (step S302). When it is determined in step S303 that the analyzed command is a connection request, the flow advances to step S304; otherwise, the flow advances to step S305.

When it is determined in step S305 that the analyzed command is a search request, the flow advances to step S306; otherwise, the flow advances to step S307. When it is determined in step S307 that the analyzed command is a display request, the flow advances to step S308; otherwise, the flow advances to step S309. When it is determined in step S309 that the analyzed command is a translation request, the flow advances to step S310; otherwise, the flow advances to step S311. When it is determined in step S311 that the analyzed command is a disconnection request, the flow advances to step S312 to disconnect the client terminal 101; otherwise, the flow returns to step S301 to continue processing.

Figure 4:
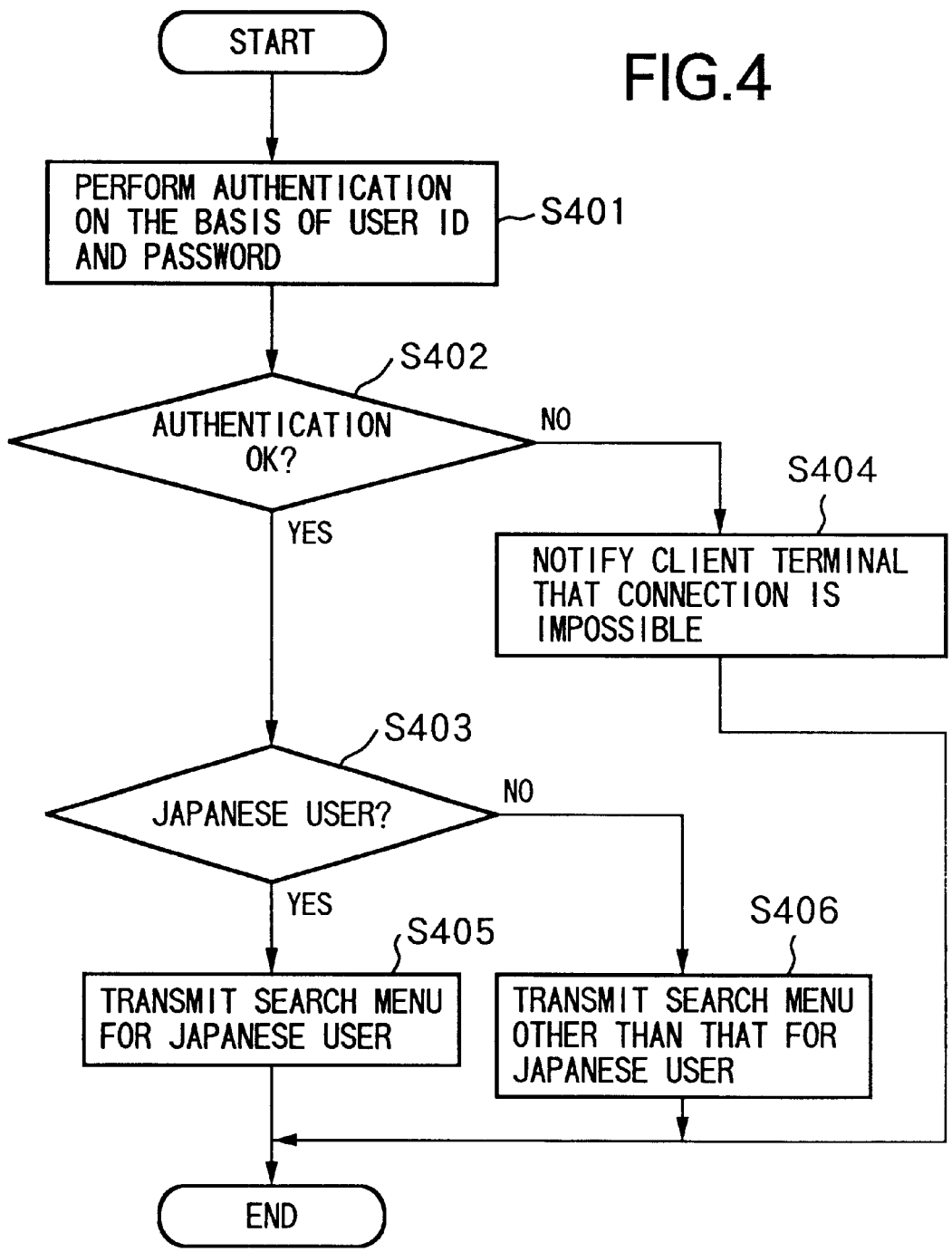
FIG. 4 is a flow chart for explaining connection processing of the patent information search apparatus 103.

"Connection" processing in step S304 will be described next with reference to FIG. 4.

The patent information search apparatus 103 authenticates the user on the basis of the user ID and password transmitted from the client terminal 101 (step S401). When it is determined that the log-in is from a user who is permitted to use the patent information search apparatus 103, a language that can be understood by the user is determined on the basis of the user ID (step S403). The patent information search apparatus 103 stores a correspondence table between user IDs, nationalities, and major languages of various countries and determines the language using this table. When the user language is specified, a search menu corresponding to the language is transmitted to the client terminal 101 of the user (steps S405 and S406).

In user authentication, if it is determined that the login is from a person other than users who are permitted to use the patent information search apparatus 103, the client terminal 101 is notified of it (step S404).

As described above, as the characteristic feature of connection processing in step S304, user authentication is performed on the basis of the user ID, the language which can be understood by the user is determined, and a search menu corresponding to the language is transmitted to the user. In the above-described language determination processing, when an ID character corresponding to the language which can be understood by the user is added to the user ID in advance, the language that can be understood by the user can be determined from the user ID.

Figure 5:
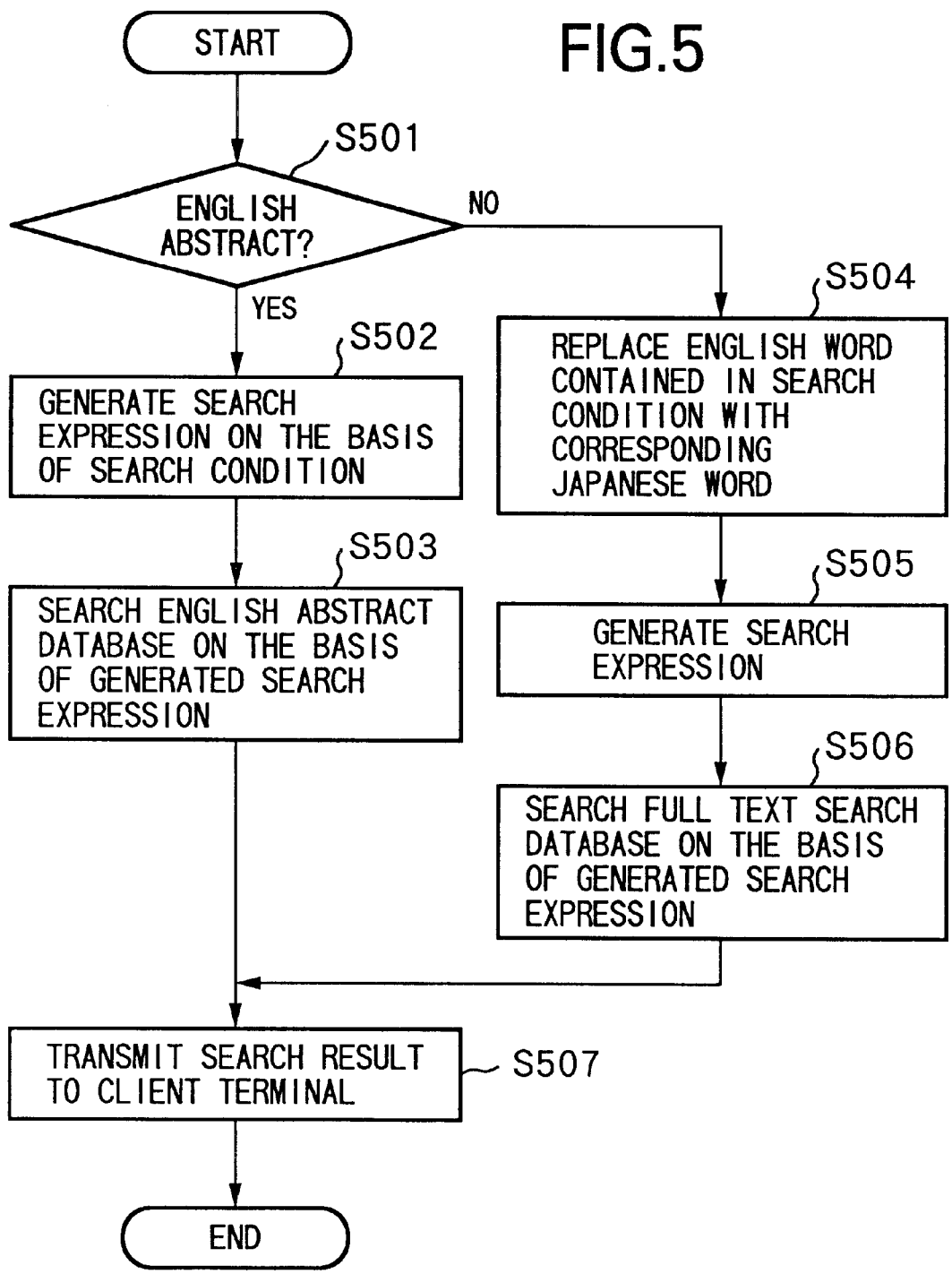
FIG. 5 is a flow chart for explaining search processing of the patent information search apparatus 103.

"Search" processing in step S306 will be described next with reference to FIG. 5.

The patent information search apparatus 103 determines whether the option designated by the user in step S204 (FIG. 2A) is the option for searching the English abstract DB 115 (step S501). Subsequently, processing of generating a search expression is performed on the basis of the search condition designated by the user. The search expression generation method when the option for searching the English abstract DB 115 is selected is different from that when the option for searching the full text search DB 116 is selected, and each case will be described.

A case wherein the option for searching the full text search DB 116 is selected will be described.

Assume that the user inputs "(cryptography or cipher or encode) and communication" to an input field 901 in FIG. 9A to perform Simple Search. The input search condition is replaced with a search condition for searching the full text search DB 116 by the search expression replacement section 107.

As shown in FIG. 11A, the full text search DB 116 is a Japanese database in which fields and contents thereof are described in Japanese. For this reason, the full text search DB 116 cannot be searched on the basis of the above-described search condition input in English. The search expression replacement section 107 replaces an input English word with a corresponding Japanese word, as will be described below.

The search expression replacement section 107 replaces the input "(cryptography or cipher or encode) and communication" with "(暗号 (ango) or 暗文 (anbun) or 暗号化 (angohka)) and 通信 (tuusin)" using the word replacement table 1202 shown in FIG. 12B (step S504). For this replacement processing, an option such as a synonym option 903 or a specialty dictionary option 904 in FIG. 9A can be designated. For example, when the synonym option 903 is designated, "伝送 (denso)", "電送 (denso)", and "伝達 (dentatsu)" corresponding to "通信 (tuusin)" are selected from the synonyms table 1201 shown in FIG. 12A, and the "(cryptography or cipher or encode) and communication" is replaced with "(暗号 (ango) or 暗文 (anbun) or 暗号化 (angohka)) and (通信 (tuusin) or 伝送 (densoh) or 電送 (densoh) or 伝達 (dentatsu)".

When the specialty dictionary option 904 is designated, a specialty dictionary in a technical field such as "computer" or "chemistry" can be selected. When the specialty dictionary option is not selected, or words corresponding to the selected specialty dictionary are not present, the word replacement table 1202 is used.

The replaced "(暗号 (ango) or 暗文 (anbun) or 暗号化 (angohka)) and 通信 (tsuusin)" in Japanese is further replaced with a language such as an SQL (Structured Query Language) for searching a relational database. More specifically, the search condition "暗号 (ango) or 暗文 (anbun) or 暗号化 (angohka)) and 通信 (tsuusin)" is replaced with an SQL language "select テキスト (text), Title from 全文検索 (zenbunnkennsaku) where (text like %暗号% (ango) or text like %暗文% (anbun) or text like %暗号化% (angouka)) and text like %通信% (tsuusin); (step S505).

In the above SQL statement, "テキスト" corresponds to the text field of a full text search table 1101, and "全文検索" (zenbunnkennsaku) corresponds to the table name of the full text search database 1101. Hence, when the SQL statement is executed, all records which satisfy the search condition "暗号 (ango) or 暗文 (anbun) or 暗号化 (angohka) and 通信 (tsuusin)" are extracted from the text field of the full text search table 1101 (step S506). The extracted result is transmitted to the client terminal 101 (step S507).

A case wherein the user is to perform Expert Search will be described below. As shown in FIG. 9B, when "Applicant" is input to an input field 906, and "TO-ZAI-NAN-BOKU KOGYO CORPORATION" is input to an input field 907, the "Applicant" input to the input field 906 is replaced with "出願人 (syutugannin)" according to the word replacement table 1202. In a similar way, the formal applicant name "TO-ZAI-NAN-BOKU KOGYO CORPORATION" in abroad which is input to the input field 907 is replaced with the formal applicant name "東西南北工業 株式会社 (Tozai Nanboku Kogyo Kabushiki-kaisha)" in Japan according to the applicant replacement table 1301 shown in FIG. 13A.

The replaced search conditions "出願人 (syutugannin)" and "東西南北工業 株式会社 (Tozai Nanboku Kogyo Kabushiki-kaisha)" are replaced with a language such as an SQL for searching a relational database, i.e., an SQL language select 出願人 (syutugannin), Title from 全文検索 (zenbunn-kensaku) where text like %東西南北工業株式会社% (%Tozai Nanboku Kogyo Kabushiki-kaisha%); (step S505).

In the above SQL statement, "出願人 (syutugannin)" corresponds to the applicant field of the full text search table 1101, and 全文検索 (zenbunn-kensaku)" corresponds to the table name of the full text search table 1101. Hence, when the SQL statement is executed, all records which satisfy the search condition "東西南北工業 株式会社 (Tozai Nanboku Kogyo Kabushiki-kaisha)" are extracted from the applicant field of the full text search table 1101 (step S506). The extracted result is transmitted to the client terminal 101 (step S507).

The input field 906 may be formed by, e.g., a combo box such that a desired condition can be selected from bibliographic items such as Publication No., Application No., Publication Date, Application Date, Applicant, IPC, US-CL, Priority No., or selection conditions such as Abstract, Claims, and Details of Invention.

For Expert Search, an option such as the synonym option 903 or specialty dictionary option can be designated as in Simple Search.

A case wherein the option for searching the English abstract DB 115 is selected by the user in step S204 will be described. When the user is input "(cryptography or cipher or encode) and communication" to the input field 901 shown in FIG. 9A for Simple Search, it is replaced with the SQL language:

select Text, Title from Abstract where (text like %cryptography% or text like %cipher% or text like %encode%) and text like %communication%; by the search expression replacement section 107 (step S502).

In the above SQL statement, "TEXT" corresponds to the TEXT field of an Abstract table 1102, and Abstract corresponds to the table name of the Abstract table 1102. Hence, when the SQL statement is executed, all records which satisfy the search condition "(cryptography or cipher or encode) and communication" are extracted from the TEXT field of the Abstract table 1102 (step S503). The extracted result is transmitted to the client terminal 101 (step S507).

When the user inputs "Applicant" to the input field 906 shown in FIG. 9B and "TO-ZAI-NAN-BOKU KOGYO CORPORATION" to the input field 907 for Expert Search, the input search conditions are replaced with an SQL language (step S502):

select Applicant, Title from Abstract where text like %TO-ZAI-NAN-BOKU KOGYO CORPORATION%;

In the above SQL statement, "Applicant" corresponds to the Applicant field of the Abstract table 1102, and Abstract corresponds to the table name of the Abstract table 1102. Hence, when the SQL statement is executed, all records which satisfy the search condition "TO-ZAI-NAN-BOKU KOGYO CORPORATION" are extracted from the Applicant field of the Abstract table 1102 (step S503). The extracted result is transmitted to the client terminal 101 (step S507).

As the characteristic feature of search processing in step S306, since a keyword (e.g., an English word) input as a character string in a language that can be understood by the user is replaced with a character string (e.g., a Japanese word) in the language of the country where the patent information search apparatus 103 is set, the user can search the database without being conscious of the difference in language.

Search processing in step S306 is not translation but replacement. More specifically, in the above example, "TO-ZAI-NAN-BOKU KOGYO CORPORATION" can be translated into "TO-ZAI-NAN-BOKU KOGYO 株式会社" in Japanese. However, search of patent databases based on this translated word is meaningless. In this embodiment, a search word is converted into another search word using a table storing a correspondence between a search word in a language and a corresponding Japanese search word, thereby allowing reliable search without omission.

Figure 6:
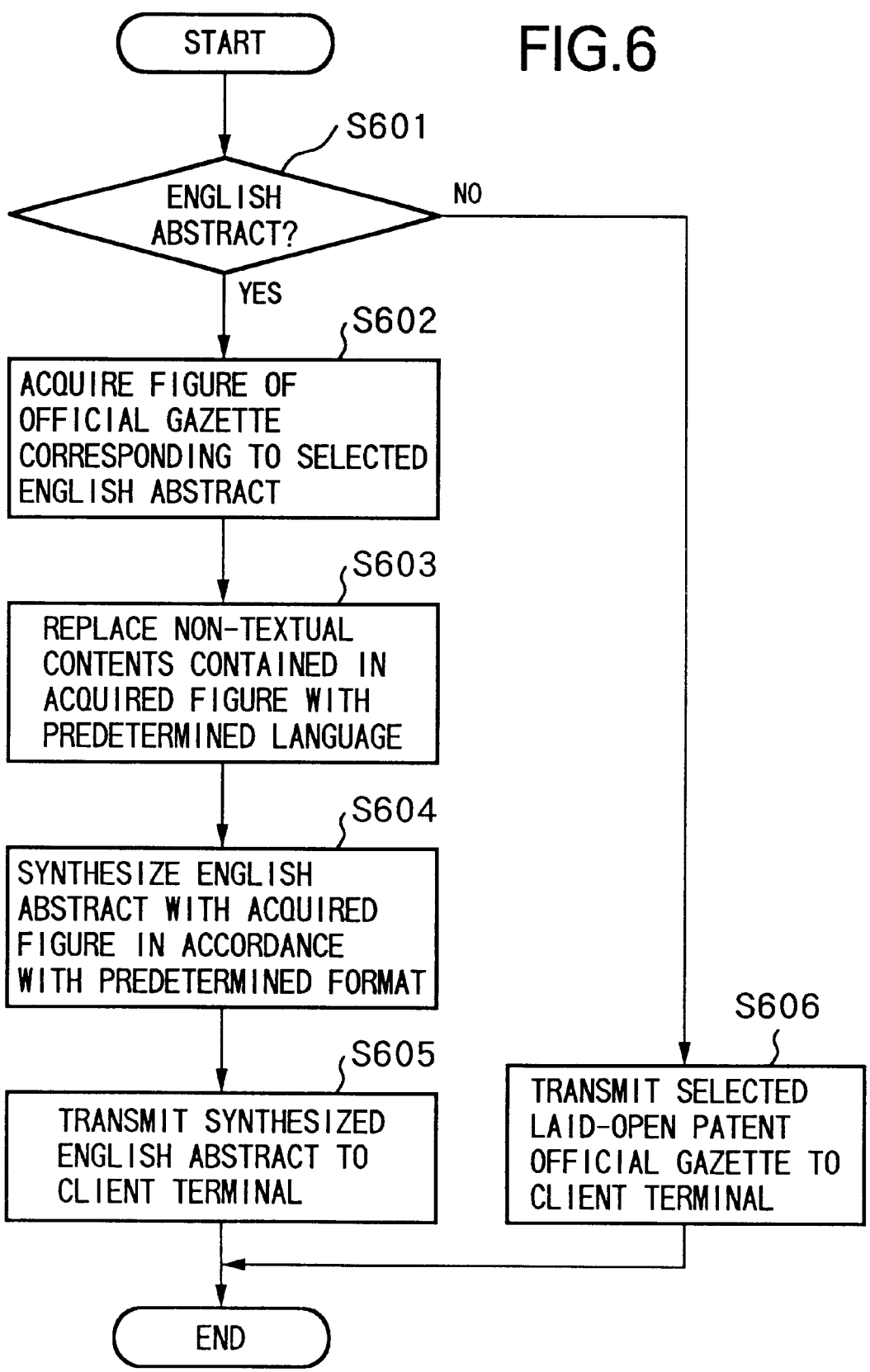
FIG. 6 is a flow chart for explaining display processing of the patent information search apparatus 103.

"Display" processing in step S308 will be described next with reference to FIGS. 6 and 14.

The patent information search apparatus 103 determines whether the option designated by the user in step S204 is the option for searching the English abstract DB 115 (step S601). When the option for searching the full text search DB 116 is selected, a laid-open patent official gazette corresponding to the clicked publication number 1002 is transmitted to the client terminal 101, as shown in FIG. 10C.

When the option for searching the English abstract DB 115 is selected, an English abstract 1401 corresponding to the clicked publication number 1002 is acquired, as shown in FIG. 10B. In addition, the image data of FIGS. 1403 accompanying a laid-open patent official gazette 1402 corresponding to the Abstract table 1102 is acquired from the full text search DB 116.

By looking up the conversion table 1302 shown in FIG. 13B, Japanese character strings representing the non-textual contents such as "図", "表", and "化" contained in the image data are replaced with corresponding English character strings. That is, "図" is replaced with "Figure". Similarly, "表" is replaced with "Chart", and "化" is replaced with "Chemical formula" (step S603). As a method of replacing the character strings, for example, optical character recognition of the image data is performed, and the recognized character strings are replaced with corresponding English character strings by looking up a predetermined conversion table.

Next, the acquired English abstract 1401 and image data 1405 in which Japanese character strings representing the non-textual contents are replaced with English character strings are synthesized in accordance with a predetermined format (step S604). Synthesized English abstract 1401 and image data 1405 are transmitted to the client terminal 101.

A conventional English abstract has only bibliographic items such as an applicant name, summary of the invention, and a figure selected by the applicant and therefore contains few information for determining whether it is an official gazette desired by the user. In some cases, official gazettes acquired by paying fees are useless. In this system, however, since a figure processed in step S603 is added to the English abstract, as described above, it can be easily determined whether the abstract is an official gazette desired by the user. Especially, it is very effective for a user outside the Japanese zone because the non-textual contents and the like are replaced with a language that can be understood by the user.

Figure 7:
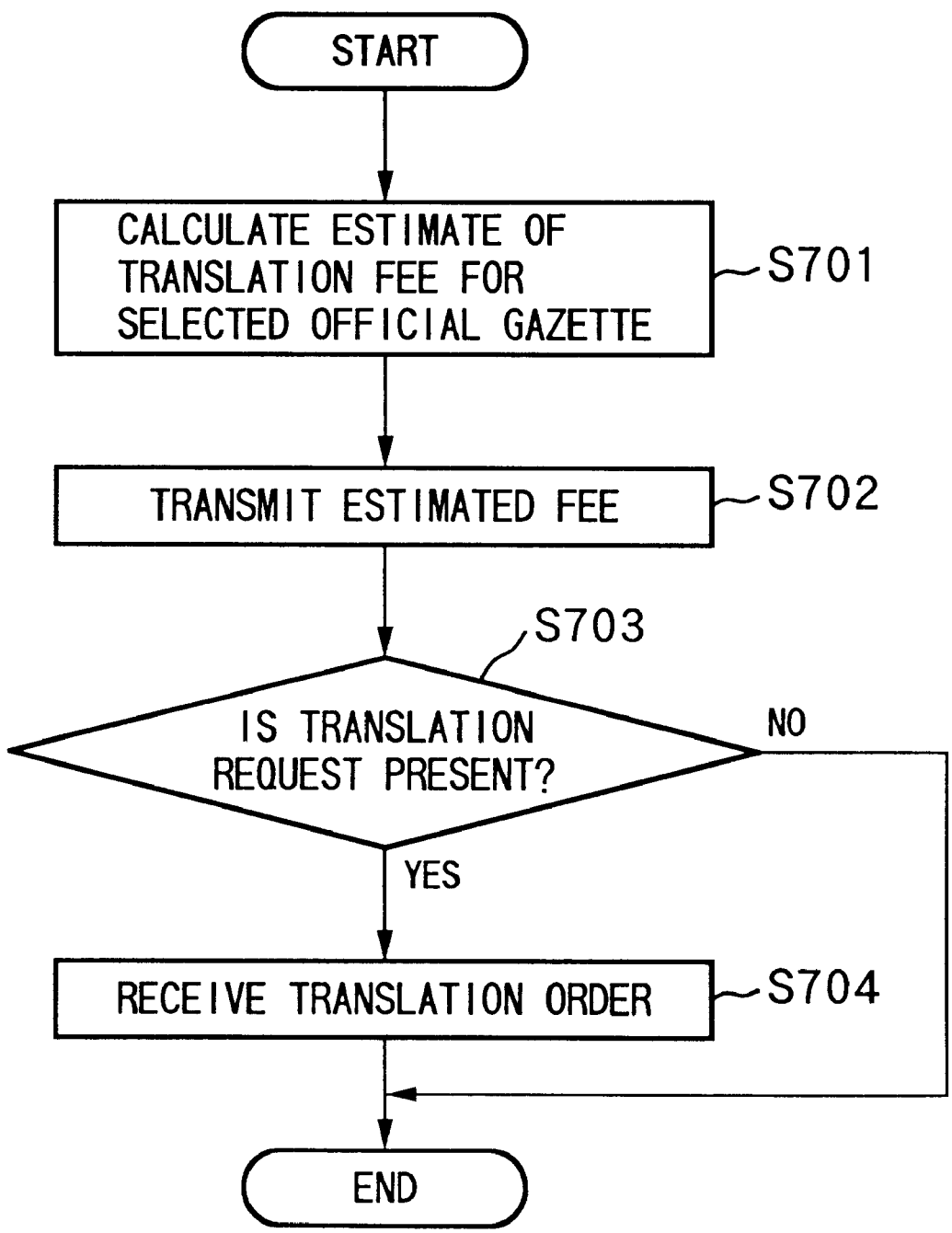
FIG. 7 is a flow chart for explaining translation processing of the patent information search apparatus 103.

"Translation" processing in step S310 will be described next with reference to FIG. 7.

The patent information search apparatus 103 calculates an estimate of the translation fee for a laid-open patent official gazette requested by the user in step S215 (FIG. 2B) (step S701). The calculated fee estimate is transmitted to the client terminal 101 (step S702). When a formal translation request is received from the user who had confirmed the fee estimate (step S704), the patent information search apparatus 103 requests a translation agency or the like to translate the laid-open patent official gazette designated by the user using, e.g., an e-mail.

That is, not the patent information search apparatus 103 but a translation agency well versed in various technical fields is charged with translation. With this arrangement, the load on the patent information search apparatus 103 can be reduced, and in addition, the translation accuracy increases as compared to translation using translation software or the like.

If the load on the patent information search apparatus 103 can be neglected, a translation engine or tool may be incorporated in the patent information search apparatus 103, as described above.

Modification of First Embodiment

The above-described patent information search system of the first embodiment can be modified to an arrangement shown in FIG. 15. The same reference numerals as in FIG. 1 denote the same means in FIG. 15, and a detailed description thereof will be omitted.

A relay apparatus 1501 comprises a CPU 1507 for controlling the entire relay apparatus 1501, a ROM 1503 storing control programs and the like for controlling the relay apparatus 1501, a RAM 1502 used as, e.g., a work area in executing a control program or the like stored in the ROM 1503, a storage section 1504 storing some of various tables 117 shown in FIG. 1 (e.g., a synonyms table 1201, a word replacement table 1202, an applicant replacement table 1301, and the like), and an interface section 1505 for connecting the apparatus to the network 102.

This relay apparatus 1501 realizes part of the function of the patent information search apparatus 103 shown in FIG. 1 independently of the patent information search apparatus 103 and corresponds to a computer system, a relaying server, or a workstation which can be set in various countries.

In this modification, when a user (e.g., an American) is to search for patent information filed in Japan, he/she is connected to the relay apparatus 1501 in the U.S.A. using the client terminal 101 and then connected to the patent information search apparatus 103 set in Japan through the relay apparatus 1501.

According to the arrangement of the patent information search system shown in FIG. 15, since user authentication, charging, and generation of a search expression for searching for patent information are performed by the relay apparatus 1501, the load no the patent information search apparatus 103 can be made light as compared to the patent information search system shown in FIG. 1. More specifically, a search database has been established as a system by long-time operation, and considerable cost is required to change the system to comply with the first embodiment. However, in this modification, a changed portion is absorbed by the relay server, so the search apparatus 103 or database server 113 need not be changed. Hence, the development cost for constructing the system of the present invention is minimized. In addition, since the patent information search apparatus 103 can be used as a server dedicated for search, the response to a user request can be improved.

As described above, according to the first embodiment and the modification thereof, when a user who cannot understand Japanese is to use a database storing Japanese patent information and the like, he/she can obtain desired information without being conscious of Japanese.

Second Embodiment

In the second embodiment, an example in which the patent information search system described in the first embodiment is applied to PATOLIS provided by Japan Patent Information Organization will be described. The arrangement and some processing operations of the patent information search system of the second embodiment are the same as in the first embodiment, and a detailed description lie thereof will be omitted.

The PATOLIS is a commercial database in which information associated with patents filed in Japan and the like can be searched for. This PATOLIS is constituted such that patent information can be searched for from various aspects. As a search method, free keyword search is used.

Free keyword search is used to search a database on the basis of technical terms. For example, when "FIND FK=暗号 (ango)" is input on the input window of PATOLIS, information such as the number of laid-open patent official gazettes containing a character string "暗号 (ango)" can be obtained.

However, since technical terms which can be used for fee keyword search are determined in advance, the user must check the technical terms in advance using a Japanese free keyword list or the like.

This free keyword search is convenient for users who can understand Japanese. However, users outside the Japanese zone cannot use this free keyword search function because of the problem of language.

In the second embodiment, even a user outside the Japanese zone (to be referred to as a "user" hereinafter) can use the free keyword search function without being conscious of Japanese.

For example, when a user wants to know a Japanese technical term corresponding to "transmission", he/she inputs FIND FK=transmission in an input field 901 shown in FIG. 9A. A search expression replacement section 107 in a patent information search apparatus 103 replaces "transmission" with a corresponding Japanese technical term by looking up a free keyword table 1601 shown in FIG. 16A. As is apparent from the free keyword table 1601, there are a plurality of free keywords corresponding to the input search condition "transmission". Hence, the patent information search apparatus 103 displays the following message to prompt the user to narrow down the search condition.

Which is the best description you need?
1. The process of transferring a signal, message, picture, or other form of intelligence from one location to another location by means of wire lines, radio, light, beams, infrared beams, or other communication systems.
2. A message, signal, or other form of intelligence that is being transmitted.
3. The gearing system by which power is transmitted from the engine to the live axle in an automobile. Also known as gearbox.
Please choose the number.

In the above-described selection texts, 1 means "送信 (soushin), 伝達 (denso)", and "伝達 (dentatsu)", 2 means "伝達文 (dentatsu-bun)" and "伝達品 (dentatsu-hin)", and 3 means "変速機 (hensokuki)".

When the user selects "1" (送信 (sousin), 伝達 (denso), 伝達 (dentatsu)), the search condition "FIND FK=transmission" is replaced with "FIND FK=送信*伝*送*伝達". A full text search DB 116 is searched on the basis of the replaced search condition.

In search based on F-terms and search according to global classification, which are provided by the PATOLIS, as well, various databases (115, 116, and 117) can be searched on-line by preparing a table like the free keyword table 1601 in which a language which can be understood by the user and Japanese technical terms such as F terms or global classification are made to correspond.

In search using US-CL (U.S. patent CLassification) as well, a patent classification of US-CL (e.g., "340") input by the user can be replaced with a corresponding patent classification of IPC (e.g., "B60Q") using an IPC replacement table 1602 shown in FIG. 16B, so the various databases (115, 116, and 117) can be searched on the basis of the replaced patent classification of IPC.

It is hard to search for patent information described in different languages because of not only the problem of language difference and but also the difference in patent system between countries. An example is the above-described difference in classification number between countries. The difference in patent system between countries cannot be solved by word translation. More specifically, in accessing a patent database in a certain country using another language, although the communication protocols for access can be matched, the patent formats cannot be matched. Hence, conventionally, a technical knowledge is always required. According to the system of the first or second embodiment, the difference in format such as the difference in classification number, the difference in applicant expression, or the difference in applicant definition is solved not by translation but by conversion or replacement. Since a search expression or keyword in the language of the country (Japanese) having the corresponding patent database is created, no search errors occur.

As described above, according to the second embodiment, by applying the present invention to a commercial database such as the PATOLIS, even a user who cannot understand Japanese can easily use the commercial database such as the PATOLIS.

As described above, according to the first and second embodiments, when a user who cannot understand Japanese wants to use a database storing Japanese patent information and the like, he/she can obtain desired information without being conscious of Japanese. The present invention can also be applied to various database search systems.

Other Modifications

In the above embodiments of the present invention, a case wherein a user whose native language is English uses the database storing Japanese patent information and the like has been described. However, the present invention is not limited to this. For example, the present invention is also effective to a case wherein a user whose native language is French uses a database storing German patent information and the like. In this case, a user interface such as a menu window is described in French, and German fields corresponding to French are formed in tables such as the word replacement table 1202 and applicant replacement table 1301.

The present invention is not limited to the connection form described in the first or second embodiment.

For example, the information search apparatus and information processing apparatus of the first or second embodiment need not always be stand-alone computer systems and may be set in one computer system. In this case, bus connection is used.

Search expression replacement of the present invention is preferably performed in the information search apparatus 103 of the first or second embodiment from the viewpoint of preventing the influence to the database server 113. However, the search expression replacement function may be imparted to the database server 113 as needed.

The present invention can be applied to a search apparatus which is not connected to a network and, more specifically, a patent information search system in which the terminal 101, search apparatus 103, and database 113 are integrated. In this case, the system is preferably a computer system operating on the basis of an OS such as Windows or Windows NT. That is, this computer system functions as both the terminal and database search apparatus. The Windows or Windows NT must be a version in a language supported by the patent information (e.g., Japanese when a PATOLIS CD-ROM is used). However, as an application program for inputting a search expression, an application in a user language (e.g., an application supported by English for an American user) is preferably used for the user's convenience. In the system of this modification, for example, when an American user (or European user) sets a PATOLIS CD-ROM in a personal computer system or workstation installed with Japanese Windows or Windows NT and an English application program, the same function as in the first or second embodiment can be obtained. For example, when a user whose native language is English wants to access the Japanese PATOLIS from his/her home country through a communication line or satellite channel, he/she need only set the CD-ROM in his/her personal computer or workstation.

In the above embodiments, a case wherein the Japanese patent database (PATOLIS) is set in Japan, and a user who is not proficient in Japanese accesses the PATOLIS database in Japan or from abroad through a communication line has been described. However, the present invention is not applied to only the Japanese PATOLIS system. When the present invention is to be applied to a patent database in a language other than Japanese (e.g., the U.S. LEXPAT), the language used for the patent database and the user language must be taken into consideration. For example, the present invention can be applied to a case wherein a user whose native language is not English accesses an patent database X (this database X is set in a country A) which uses English in the country A or from abroad through a communication line.

As a further modification of the modification (FIG. 15) of the first embodiment, a database constructing function is imparted to the relay apparatus. In this case, the relay apparatus sends a number of search requests sent from a plurality of terminals to the information search apparatus 103 through the network, and the search results are stored in the relay apparatus. Upon receiving a search request from a terminal device, the relay apparatus searches the internal database first. Only when no result is obtained by searching the database, the relay apparatus sends the search request to the database 113.

The network applied to the above embodiments can include all existing networks (the Internet and personal computer networks).

In the above embodiments of the present invention, the user searches for information related to patents. However, the present invention is not limited to this and can be applied to search of information associated with utility models, designs, or trademarks.

As has been described above, according to the present invention, a patent information search system and apparatus that can be easily used by a foreigner, an information search relay apparatus, and a search method therefor can be provided.

As many apparently widely different embodiments of the present invention can be made without departing from the spirit and scope thereof, it is to be understood that the invention is not limited to the specific embodiments thereof except as defined in the appended claims.

What is claimed is:

1. A patent information search system having a patent information processing apparatus to input a search expression for searching for patent information containing bibliographic information and information other than the bibliographic information, and a patent information search apparatus to search a patent information database storing patent information such as bibliographic information based on a predetermined search expression, comprising:

said patent information processing apparatus includes:
an input unit enabling a user to input a first search expression including a first natural language expression that can be understood by the user;
a search expression replacement unit to replace the input first search expression with a second search expression, including a second natural language expression different from the first natural language expression, such that the second search expression is a replacement based on bibliographic information search contents of the first search expression and thereby suitable for searching the patent information database in the second natural language; and a first transmission unit to transmit the replaced second search expression to said patent information search apparatus, and said patent information search apparatus includes:

a search unit to search the patent information database based on the received second search expression; and a second transmission unit to transmit a search result to said patent information processing apparatus, wherein said replacement includes a replacement table for replacing components of the first search expression described in the first language with components of the second search expression described in the second language used in the database.

2. The system according to claim 1, characterized in that said patent information search apparatus further comprises a determination unit for determining the first language that can be understood by the user who has generated the first search expression, based on unique information for specifying the user.

3. The system according to claim 1, characterized in that said patent information search apparatus further comprises a translation unit to translate patent information described in the second language so as to translate a character string contained in a figure into a character string in the first language that can be understood by the user.

4. The system according to claim 1, characterized in that said patent information search apparatus is connected, through a network, to a translation server for translating patent information described in the second language, and further comprises a translation request issuing unit to issue a request to translate the search result from said search unit into the first language that can be understood by the user.

5. The system according to claim 1, characterized in that the replacement table contains at least one of a table for replacing an applicant name in the first search expression with an applicant name described in the second language used in the database, and a table for replacing a patent classification code in the first search expression with a patent classification code of the database.

6. The system according to claim 1, characterized in that the patent information database stores at least information associated with English abstracts, free keywords, F-term codes, and International Patents Classification, which correspond to official gazettes of patents, utility models, designs, and trademarks.

7. The system according to claim 1, characterized in that the bibliographic information used in the search expression contains at least one of an applicant name, a patent classification, a publication number, a publication date, an application number, an application date, an official gazette type, and a country of priority claim.

8. The system according to claim 1, characterized in that the replacement table replaces the bibliographic information in the search expression between the U.S. Patents Classification and the International Patents Classification.

9. The system according to claim 1, characterized in that the replacement table replaces the bibliographic information in the search expression between a date in the Japanese year and a date in the dominical year.

10. The system according to claim 1, characterized in that the bibliographic information contains at least one of information associated with an examination procedure, information associated with an appeal procedure, and information associated with registration.

11. The system according to claim 1, characterized in that said patent information processing apparatus comprises a client terminal connected to said patent information search apparatus through a network.

12. The system according to claim 11, characterized in that said client terminal comprises an emulator terminal of said patent information search apparatus.

13. The system according to claim 1, characterized in that said patent information processing apparatus further comprises:

a computer information processing apparatus connected to said patent information search apparatus and including at least said replacement unit and said first transmission unit, and a client terminal connected to said computer information processing apparatus through a network and including said input unit.

14. The system according to claim 1, characterized in that said patent information processing apparatus further comprises:

a patent information database as said patent information search apparatus, said replacement unit and first transmission unit, a computer information processing apparatus connected to the patent information database, said replacement unit, and said first transmission unit through a bus, and a plurality of client terminals each connected to said computer information processing apparatus through a communication network and including said input unit.

15. The system according to claim 14, characterized in that said computer information processing apparatus incorporates a translation engine.

16. The system according to claim 1, characterized in that said patent information processing apparatus further comprises a display to display the search result in a form that can be understood by the user.

17. The system according to claim 16, characterized in that said display includes a translating unit to translate the search result described in the second language into the first language that can be understood by the user by machine translation.

18. The system according to claim 16, characterized in that said display displays the search result added with an existing English abstract.

19. The system according to claim 1, characterized in that when the search result from said search unit represents that a country of priority claim is a country using the language of patent information for said search unit, said information processing apparatus generates a command for causing said search unit to search for an English abstract and receives a processing result from said search unit according to the command from said search unit.

20. The system according to claim 19, characterized in that said patent information processing apparatus has a terminal for displaying a processing result associated with priority claim.

21. The system according to claim 1, characterized in that when the search result from said search unit represents that a country of priority claim is a country using the language of patent information for said search unit, said patent information search apparatus searches for a corresponding English abstract and transmits the searched English abstract to said patent information processing apparatus.

22. The system according to claim 1, characterized in that when the search result from said search unit represents that a country of priority claim is a country using a language other than the language of patent information for said search unit, said patent information processing apparatus generates a link to a network to the country of priority claim and returns the link to the network to the user.

23. The system according to claim 22, characterized in that the link to the network is an URL address.

24. The system according to claim 1, characterized in that said search unit searches the patent information database based on information other than the bibliographic information.

25. A patent information search method using a patent information processing apparatus to input a search expression for searching for patent information containing bibliographic information and information other than the bibliographic information, and a patent information search method for searching a patent information database storing patent information such as bibliographic information based on of a predetermined search expression, comprising:

inputting a first search expression including a first natural language expression that can be understood by a user in said patent information processing apparatus;

replacing the input first search expression with a second search expression, including a second natural language expression different from the first natural language expression, such that the second search expression is a replacement based on bibliographic information search contents of the first search expression and thereby suitable for searching the patent information database in the second natural language;

transmitting the replaced second search expression to said patent information search method;

searching the patent information database based on the received second search expression in said patent information search method; and transmitting a search result to said patent information processing apparatus, wherein, in said replacing of the input first search expression, the replacing the input first search expression with the second search expression is performed by using a replacement table for replacing components of the first search expression described in the first language with components of the second search expression described in the second language used in the database.

26. The method according to claim 25, characterized in that said replacing of the input first search expression further comprises determining the first language that can be understood by the user who has generated the first search expression, based on unique information for specifying the user.

27. The method according to claim 25, characterized in that said searching of the patent information database further comprises translating patent information described in the second language so as to translate a character string contained in a figure into a character string in the language that can be understood by the user.

28. The method according to claim 25, characterized in that said searching of the patent information database comprises issuing a request to a translation server connected to said search apparatus through a network to translate patent information described in the second language so as to translate the search result into the first language that can be understood by the user.

29. The method according to claim 25, characterized in that said replacing of the input first search expression further comprises:

replacing an applicant name in the first search expression with an applicant name described in the second language used in the database, or replacing a patent classification code in the first search expression with a patent classification code of the database.

30. The method according to claim 25, characterized in that the patent information database stores at least information associated with English abstracts, free keywords, F-term codes, and International Patents Classification, which correspond to official gazettes of patents, utility models, designs, and trademarks.

31. The method according to claim 25, characterized in that the bibliographic information used in the search expression contains at least one of an applicant name, a patent classification, a publication number, a publication date, an application number, an application date, an official gazette type, and a country of priority claim.

32. The method according to claim 25, characterized in that said replacing of the input first search expression further comprises replacing the bibliographic information in the search expression between the U.S. Patents Classification and the International Patents Classification.

33. The method according to claim 25, characterized in that said replacing of the input first search expression further comprises replacing the bibliographic information in the search expression between a date in the Japanese year and a date in the dominical year.

34. The method according to claim 33, characterized in that said client terminal comprises an emulator terminal of said patent information search apparatus.

35. The method according to claim 25, characterized in that the bibliographic information contains at least one of information associated with an examination procedure, information associated with an appeal procedure, and information associated with registration.

36. The method according to claim 25, characterized in that the search result is returned to a client terminal connected through a network.

37. The method according to claim 36, characterized in that said computer information processing apparatus incorporates a translation engine.

38. The method according to claim 25, characterized in that said replacing of the input first search expression and said transmitting of the replaced second search expression are performed in at least one computer information processing apparatus, and said inputting of the first search expression is executed in a client terminal connected to said computer information processing apparatus through a network.

39. The method according to claim 25, characterized in that said searching of the patent information database, said replacing of the input first search expression, and said transmitting of the replaced second search expression are performed in a computer information processing apparatus, and said inputting of the first search expression is executed in a client terminal connected to said computer information processing apparatus rough a communication network.

40. The method according to claim 25, characterized in that the search result is displayed in a form that can be understood by the user in said patent information processing apparatus.

41. The method according to claim 40, characterized in that said displaying of the search result further comprises translating the search result described in the second language into the language that can be understood by the user by machine translation.

42. The method according to claim 40, characterized in that said displaying of the search result further comprises displaying the search result added with an existing English abstract.

43. The method according to claim 25, wherein said patent information search method further comprises generating a command for searching for an English abstract and receiving a processing result according to the command when the search result in said searching of the patent information database represents that a country of priority claim is a country using the language of patent information for a search unit implementing said searching of the patent information database.

44. The method according to claim 43, characterized in that said patent information processing apparatus has a terminal for displaying a processing result associated with priority claim.

45. The method according to claim 25, wherein said patent information search method further comprises searching for a corresponding English abstract and transmitting the searched English abstract to said patent information processing apparatus when the search result in said searching of the patent information database represents that a country of priority claim is a country using the language of patent information for a search unit implementing said searching of the patent information database.

46. The method according to claim 25, wherein said patent information search method further comprises generating a link to a network to the country of priority claim and returning the link to the network to the user when the search result in said searching of the patent information database represents that a country of priority claim is a country using a language other than the language of patent information for a search unit implementing said searching of the patent information database.

47. The method according to claim 46, characterized in that the link to the network is an URL address.

48. The method according to claim 46, characterized by further comprising sequentially storing search results received from said patent information search apparatus to form a database,
searching the new database using the replaced second search expression, and
when no result is obtained from the new database, transmitting the replaced second search expression.

49. The method according to claim 25, characterized in that said searching of the patent information database further comprises searching the patent information database based on information other than the bibliographic information.

50. A storage medium which stores a program to control a patent information search system having a patent information search apparatus to search a patent information database based on an input search expression and a patent information processing apparatus connected to said patent information search apparatus through a network, comprising:

a program code for replacing an input first search expression, including a first natural language expression that can be understood by a user, with a second search expression, including a second natural language expression different from the first natural language expression, such that the second search expression is a replacement based on bibliographic information search contents of the first search expression and thereby suitable for searching the patent information database in the second natural language;
a program code for transmitting the replaced second search expression to said patent information search apparatus;
a program code for searching the patent information database based on the received second search expression; and
a program code for transmitting a search result to said patent information processing apparatus,
wherein, when said program code for replacing is executed, the replacing the input first search expression with the second search expression is performed by using a replacement table, prepared in advance, for replacing components of the first search expression described in the first language with components of the second search expression described in the second language used in the database.

51. A multiple language search system, comprising:

an input unit enabling a user to input a first search expression, including a first natural language expression, for searching an information database based upon bibliographic information;
a replacement unit to replace the input first search expression with a second search expression, including a second natural language expression, such that the second search expression is a replacement based on bibliographic information search contents of the first search expression and thereby suitable for searching the information database in the second natural language;
a search unit to search the information database based on the second search expression; and
a display unit to display a search result of the search unit in the second natural language,
wherein the display unit further replaces non-textual expressions in the first natural language with corresponding expressions in the second natural language and/or replaces expressions in the first natural language with corresponding non-textual expressions in the second natural language.

52. The multiple language search system of claim 51, wherein the bibliographic information is patent bibliographic information.

53. The multiple language search system of claim 52, further comprising an applicant replacement table for replacing an applicant expression in the first search expression with an equivalent second natural language applicant expression in the second search expression.

54. The multiple language search system of claim 52, wherein the patent bibliographic information corresponds to at least any one of a publication no., application no., publication date, application date, International Patent Classification, US patent classification, and priority no.

55. The multiple language search system of claim 54, further comprising an International Patent Classification/US patent classification replacement table.

56. The multiple language search system of claim 52, wherein the patent bibliographic information corresponds to at least any one of an abstract, summary of an invention, and a figure.

57. The multiple language search system of claim 51, wherein the second natural language is a language of a country picked by the user.

58. The multiple language search system of claim 51, wherein the replacement unit replaces non-textual expressions of the first natural language with corresponding expressions in the second natural language.

59. The multiple language search system of claim 51, wherein the replacement unit replaces the first search expression with a second search expression consistent with a corresponding second natural language technical term specifically oriented for the information database.

60. The multiple language search system of claim 59, wherein the technical term is specifically oriented for a PATOLIS database.

61. The multiple language search system of claim 51, wherein the bibliographic information is trademark bibliographic information.

62. The multiple language search system of claim 61, wherein the replacement unit further comprises a replacement table to replace an applicant expression in the first search expression with an equivalent second natural language applicant expression in the second search expression.

63. The multiple language search system of claim 61, further comprising a display unit to display a search result of the search unit in the second natural language, wherein the display unit replaces non-textual expressions in the first natural language with corresponding expressions in the second natural language and/or replaces expressions in the first natural language with corresponding non-textual expressions in the second natural language.

64. The multiple language search system of claim 51, wherein the user unit, replacement unit, and search unit are integrated.

65. The multiple language search system of claim 51, wherein the user unit is remote from the replacement and search units, with the user unit connecting to the replacement and search units through a network.

66. The multiple language search system of claim 51, wherein the user and replacement units are remote from the search unit, with the user and replacement units connecting to the search unit through a network.

67. The multiple language search system of claim 51, wherein the second search expression includes structured query expressions in addition to expressions in the second natural language.

68. A searching method, comprising:
    inputting a first search expression, including a first natural language expression, for searching a patent information database based upon bibliographic information;
    replacing the input first search expression with a second search expression, including a second natural language expression, such that the second search expression is a replacement based on bibliographic information search contents of the first search expression rather than a replacement based solely on a translation of the first search expression;
    searching the patent information database, in the second natural language, based on the second search expression; and
    displaying search results of the searching of the information database, wherein non-textual expressions in the first natural language are replaced with corresponding expressions in the second natural language and/or expressions in the first natural language are replaced with corresponding non-textual expressions in the second natural language,
    wherein the replacing of the input first search expression includes replacing applicant information in the first natural language with applicant information in the second natural language, replacing patent classification numbers for a first country with patent classification numbers of a second country, and replacing the first search expression with the second search expression such that the second search expression includes structured query expressions.

69. A method of searching, comprising:
    inputting a first search expression, including a first natural language expression, for searching an information database based upon bibliographic information;
    replacing the input first search expression with a second search expression, including a second natural language expression, such that the second search expression is a replacement based on bibliographic information search contents of the first search expression and thereby suitable for searching the information database in the second natural language; and
    searching the information database based on the second search expression,
    wherein the replacing of the input search expression further comprises replacing a patent classification expression for a first country in the first search expression with an equivalent patent classification expression for a second country in the second search expression.

70. The searching method of claim 69, wherein the bibliographic information is patent bibliographic information.

71. The searching method of claim 70, wherein the replacing of the input search expression further comprises replacing an applicant expression in the first search expression with an equivalent second natural language applicant expression in the second search expression.

72. The searching method of claim 69, wherein the replacing of the input search expression further comprises replacing non-textual expressions of the first natural language with corresponding expressions in the second natural language and/or replacing expressions in the first natural language with corresponding non-textual expressions in the second language.

73. The searching method of claim 69, further comprising displaying a search result of the searching of the information database.

74. The searching method of claim 73, Wherein the displaying of the search result further comprises replacing non-textual expressions in the first natural language with corresponding expressions in the second natural language and/or replacing expressions in the first natural language with corresponding non-textual expressions in the second natural language.

75. The searching method of claim 69, wherein the bibliographic information is trademark bibliographic information.

76. The searching method of claim 75, wherein the replacing of the input search expression further comprises replacing an applicant expression in the first search expression with an equivalent second natural language applicant expression in the second search expression.

77. The searching method of claim 75, further comprising displaying a search result of the searching of the information database, wherein non-textual expressions in the first natural language are replaced with corresponding expressions in the second natural language and/or expressions in the first natural language are replaced with corresponding non-textual expressions in the second natural language.

78. The searching method of claim 69, wherein the replacing of the input search expression further comprises replacing the first search expression with the second search expression such that the second search expression includes structured query expressions.

* * * * *

UNITED STATES PATENT AND TRADEMARK OFFICE
CERTIFICATE OF CORRECTION

PATENT NO. : 6,571,241 B1
DATED : May 27, 2003
INVENTOR(S) : Makifumi Nosohara

It is certified that error appears in the above-identified patent and that said Letters Patent is hereby corrected as shown below:

<u>Title page,</u>
Item [75], Inventor, change "Makifumi Nosohara, Hiroshimi (JP)" to
-- Makifumi Nosohara, Hiroshima (JP) --.

Signed and Sealed this

Fourth Day of May, 2004

JON W. DUDAS
*Acting Director of the United States Patent and Trademark Office*